(12) United States Patent
Sansum et al.

(10) Patent No.: US 12,297,631 B2
(45) Date of Patent: May 13, 2025

(54) RECIRCULATING SHOWER SYSTEM

(71) Applicant: KOHLER MIRA LIMITED, Cheltenham (GB)

(72) Inventors: Nigel Sansum, Quedgeley (GB); Kevin Peel, Cheltenham (GB); Craig Fitton, Cheltenham (GB); Robin Whitfield, Cheltenham (GB)

(73) Assignee: Kohler Mira Limited, Cheltenham (GB)

( * ) Notice: Subject to any disclaimer, the term of this patent is extended or adjusted under 35 U.S.C. 154(b) by 3 days.

(21) Appl. No.: 18/355,912

(22) Filed: Jul. 20, 2023

(65) Prior Publication Data

US 2024/0018761 A1    Jan. 18, 2024

Related U.S. Application Data

(63) Continuation of application No. 17/364,284, filed on Jun. 30, 2021, now Pat. No. 12,180,692.

(60) Provisional application No. 63/047,108, filed on Jul. 1, 2020.

(51) Int. Cl.
*E03C 1/04* (2006.01)
*E03B 1/04* (2006.01)

(52) U.S. Cl.
CPC .......... *E03C 1/0408* (2013.01); *E03B 1/041* (2013.01); *E03B 2001/045* (2013.01)

(58) Field of Classification Search
CPC .................................................. E03C 1/0408
See application file for complete search history.

(56) References Cited

U.S. PATENT DOCUMENTS

| | | | |
|---|---|---|---|
| 4,224,700 | A | 9/1980 | Bloys |
| 4,599,166 | A | 7/1986 | Gesslauer |
| 4,619,311 | A | 10/1986 | Vasile et al. |
| 4,828,709 | A | 5/1989 | Houser et al. |
| 4,893,364 | A | 1/1990 | Keeler |
| 5,093,943 | A | 3/1992 | Wei |
| 5,233,706 | A | 8/1993 | Maehr |
| 5,265,287 | A | 11/1993 | Henkin et al. |
| 5,285,537 | A | 2/1994 | Hanks |
| 5,293,654 | A | 3/1994 | Castwall et al. |
| 5,309,582 | A | 5/1994 | Henkin et al. |
| 5,353,448 | A | 10/1994 | Lee |
| 5,608,927 | A | 3/1997 | Lowry et al. |
| 7,308,724 | B2 | 12/2007 | Ho |

(Continued)

FOREIGN PATENT DOCUMENTS

| | | |
|---|---|---|
| CN | 203759496 U | 8/2014 |
| CN | 104930716 A | 9/2015 |

(Continued)

*Primary Examiner* — Christine J Skubinna
(74) *Attorney, Agent, or Firm* — Husch Blackwell LLP

(57) ABSTRACT

The present disclosure relates to a recirculating shower system. The recirculating shower system may include a first shower outlet and a second shower outlet. The recirculating shower system may include a fresh water conduit fluidly coupled to the first shower outlet and a recirculated fluid conduit fluidly coupled to the second shower outlet. The fresh water conduit and the recirculated fluid conduit may be arranged such that warmer fresh water flowing through the fresh water conduit may heat cooler recirculated fluid flowing through the recirculated fluid conduit.

16 Claims, 16 Drawing Sheets

(56) References Cited

U.S. PATENT DOCUMENTS

| | | |
|---|---|---|
| 7,360,723 B2 | 4/2008 | Lev |
| 8,501,013 B2 | 8/2013 | Guttau et al. |
| 8,656,526 B2 | 2/2014 | Brewin |
| 9,074,355 B2 | 7/2015 | Jallon et al. |
| 9,623,133 B2 | 4/2017 | Childress et al. |
| 9,956,306 B2 | 5/2018 | Brais et al. |
| 9,956,512 B2 | 5/2018 | Mahdjoubi Namin |
| 10,006,645 B1 | 6/2018 | Howard |
| 10,053,841 B2 | 8/2018 | Mahdjoubi Namin et al. |
| 10,596,500 B2 | 3/2020 | Mahdjoubi Namin |
| 10,772,981 B2 | 9/2020 | Childress et al. |
| 10,857,249 B2 | 12/2020 | Brais et al. |
| 10,883,258 B2 | 1/2021 | Ridell |
| 10,947,705 B2 | 3/2021 | Ridell et al. |
| 2009/0300839 A1 | 12/2009 | Gay |
| 2011/0225722 A1 | 9/2011 | Valdenaire |
| 2013/0205493 A1 | 8/2013 | Vigneron et al. |
| 2014/0033422 A1 | 2/2014 | Christy |
| 2014/0053909 A1 | 2/2014 | Savage |
| 2014/0263689 A1 | 9/2014 | Patton et al. |
| 2016/0153180 A1 | 6/2016 | Betgem |
| 2016/0312447 A1 | 10/2016 | Sparre et al. |
| 2016/0319522 A1 | 11/2016 | Sparre et al. |
| 2017/0136473 A1* | 5/2017 | Yu ................... A47K 3/28 |
| 2017/0145669 A1 | 5/2017 | Klicpera et al. |
| 2018/0022618 A1 | 1/2018 | Bertrand et al. |
| 2018/0362367 A1 | 12/2018 | Mahdjoubi Namin et al. |
| 2019/0003157 A1* | 1/2019 | Greidanus ............. E03C 1/00 |
| 2019/0126295 A1* | 5/2019 | Kington ................ B05B 1/16 |
| 2019/0323209 A1 | 10/2019 | Mahdjoubi Namin |
| 2019/0323211 A1 | 10/2019 | Mahdjoubi Namin |
| 2019/0368167 A1 | 12/2019 | Ridell et al. |
| 2020/0101185 A1 | 4/2020 | Rehn et al. |
| 2020/0141838 A1 | 5/2020 | Ridell |
| 2020/0291623 A1 | 9/2020 | Ridell |
| 2020/0299940 A1 | 9/2020 | Ridell |
| 2020/0385285 A1 | 12/2020 | Oscarson et al. |
| 2021/0017741 A1 | 1/2021 | Mare |
| 2021/0047202 A1 | 2/2021 | Ridell |
| 2021/0237102 A1* | 8/2021 | Westgate ............ B05B 15/68 |

FOREIGN PATENT DOCUMENTS

| | | |
|---|---|---|
| CN | 105298317 B | 9/2017 |
| CN | 107219876 A | 9/2017 |
| CN | 106354185 B | 5/2018 |
| CN | 207394963 U | 5/2018 |
| CN | 212183762 U | 12/2020 |
| DE | 4124605 A1 | 1/1993 |
| EP | 2818598 A1 | 12/2014 |
| EP | 2962612 A1 | 1/2016 |
| EP | 3084085 A1 | 10/2016 |
| EP | 3084086 A1 | 10/2016 |
| EP | 3387192 A1 | 10/2018 |
| EP | 3545143 A1 | 10/2019 |
| EP | 3562363 A1 | 11/2019 |
| EP | 3562364 A1 | 11/2019 |
| EP | 3619368 A1 | 3/2020 |
| EP | 3643685 A1 | 4/2020 |
| EP | 3651626 A1 | 5/2020 |
| WO | 2004035095 A1 | 4/2004 |
| WO | 2004101902 A1 | 11/2004 |
| WO | 2005083188 A1 | 9/2005 |
| WO | 2007113681 A2 | 10/2007 |
| WO | 2008020288 A2 | 2/2008 |
| WO | 2008046992 A2 | 4/2008 |
| WO | 2010092293 A1 | 8/2010 |
| WO | 2011137490 A1 | 11/2011 |
| WO | 2018056816 A1 | 3/2018 |
| WO | 2018169394 A1 | 9/2018 |
| WO | 2019071421 A1 | 4/2019 |
| WO | 2019117782 A1 | 6/2019 |
| WO | 2019164436 A1 | 8/2019 |
| WO | 2020112002 A1 | 6/2020 |
| WO | 2020145875 A1 | 7/2020 |
| WO | 2020159421 A1 | 8/2020 |
| WO | 2021039159 A1 | 3/2021 |

* cited by examiner

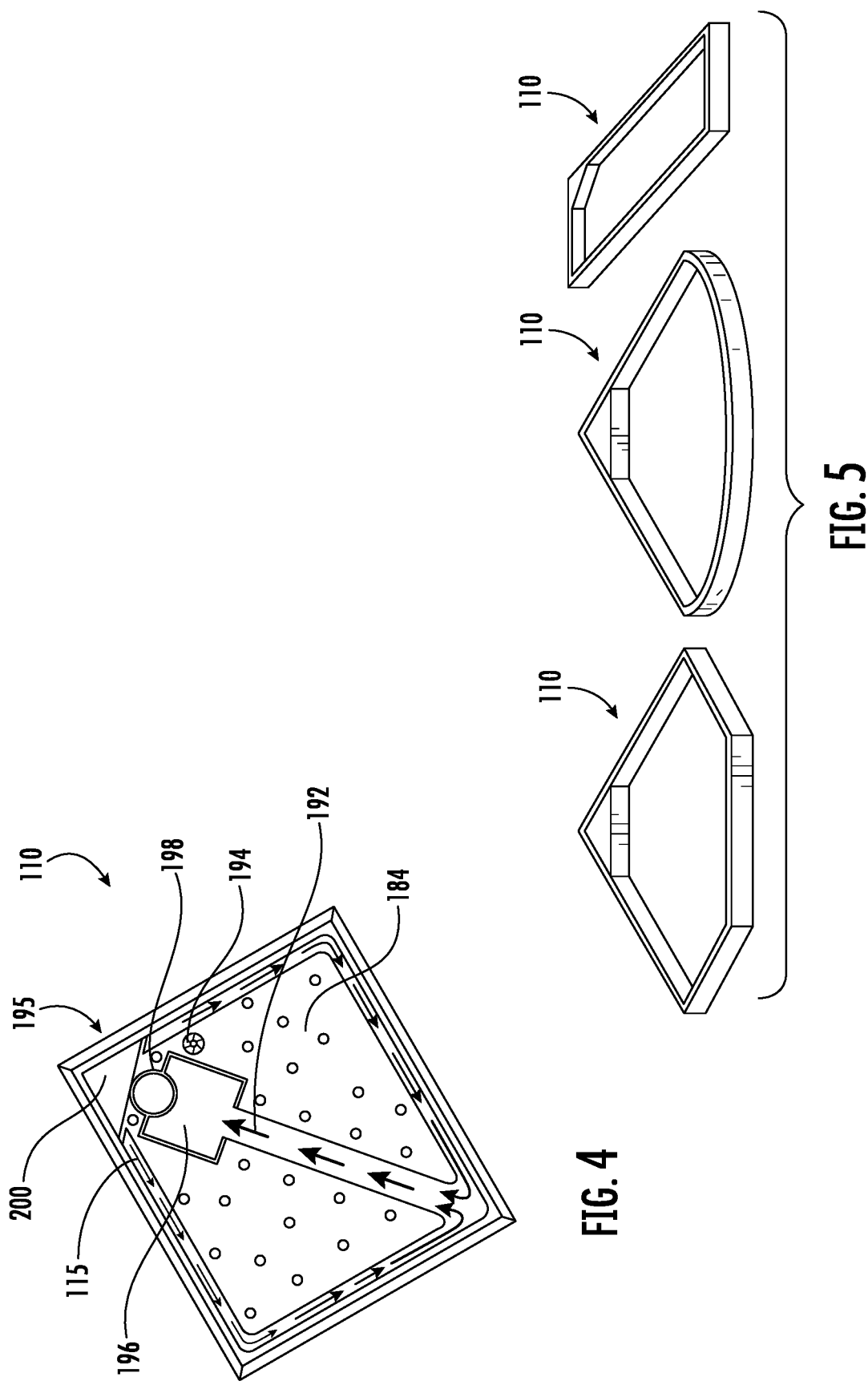

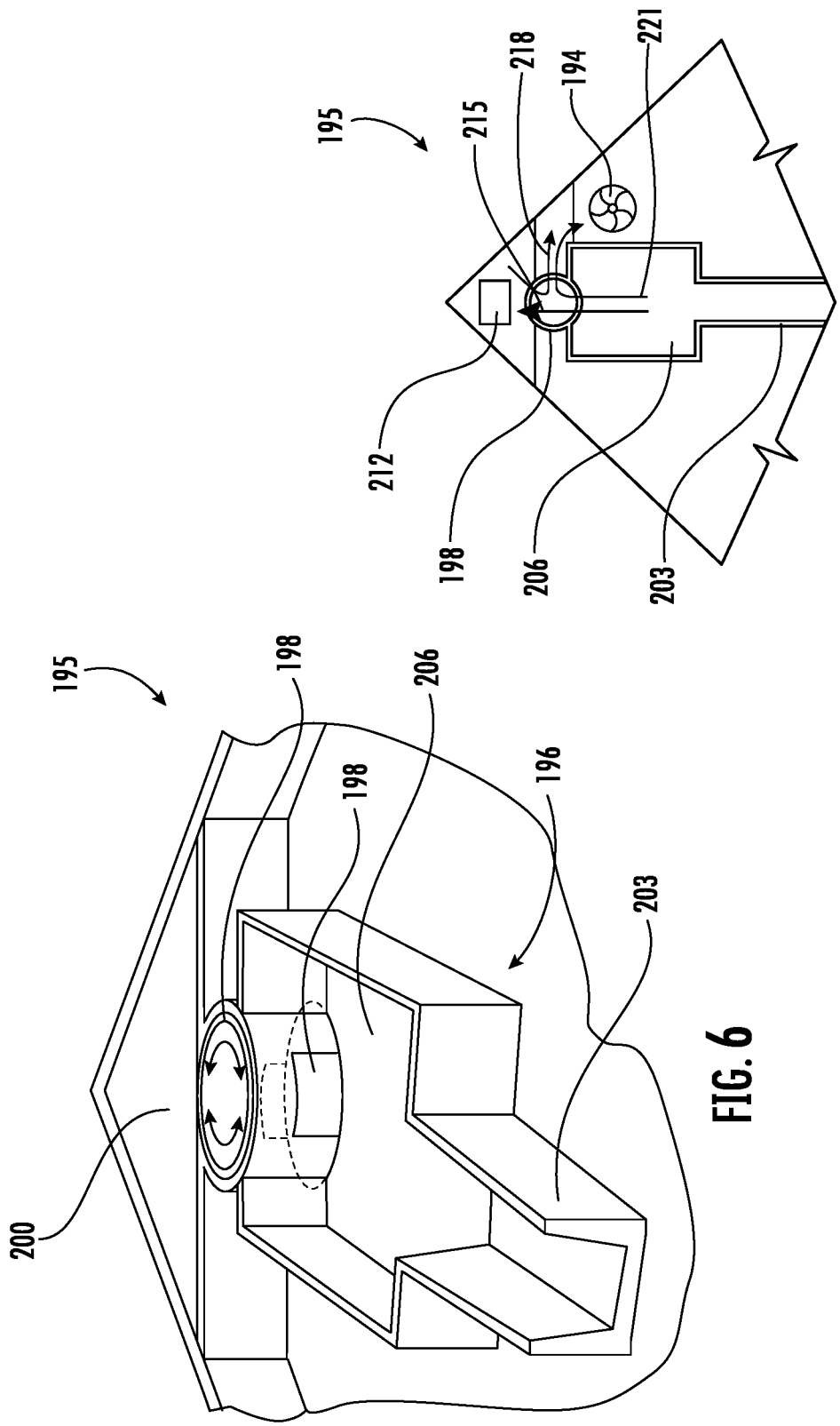

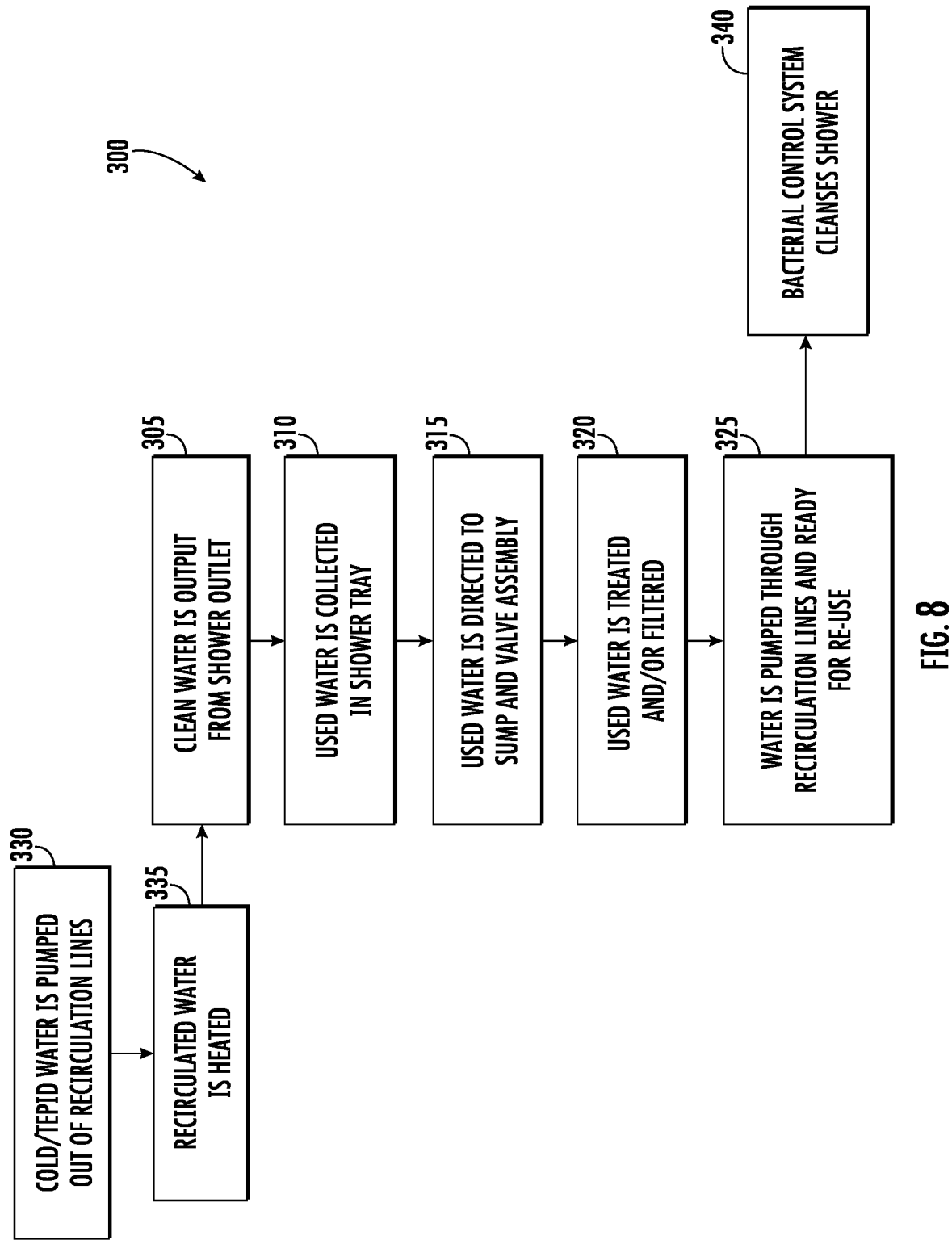

RECIRCULATING SHOWER SYSTEM

CROSS-REFERENCE TO RELATED PATENT APPLICATIONS

This application is a continuation of U.S. application Ser. No. 17/364,284, filed on Jun. 30, 2021, which claims the benefit of and priority to U.S. Patent Application No. 63/047,108, filed Jul. 1, 2020, the entireties of which are hereby incorporated by reference herein.

BACKGROUND

The present disclosure relates generally to the field of shower systems and, more particularly, to the field of water-recirculating shower systems.

Existing showers, which may be installed in private (e.g., homes) or public (e.g., gyms, hotels) locations, may consume significant amounts of water with each use. It may be desirable in certain circumstances to reduce the amount of water consumed and the amount of waste produced from each shower, which may advantageously contribute to enhanced water conservation and reduced water pollution.

Accordingly, it would be advantageous to provide an improved shower system that can recycle and recirculate dispensed water to reduce pollution and consumption of clean, fresh water.

SUMMARY

One embodiment of the present disclosure relates to a recirculating shower system that includes a first shower outlet and a second shower outlet. The recirculating shower system may include a fresh water conduit fluidly coupled to the first shower outlet and a recirculated fluid conduit fluidly coupled to the second shower outlet. The fresh water conduit and the recirculated fluid conduit may be arranged such that warmer fresh water flowing through the fresh water conduit may heat cooler recirculated fluid flowing through the recirculated fluid conduit.

One embodiment of the present disclosure relates to a recirculating shower system that includes a first fluid chamber fluidly coupled to a first shower outlet and a second fluid chamber fluidly coupled to a second shower outlet. The recirculating shower system may include a receptacle operably coupled to the first shower outlet and the second shower outlet. The receptacle may be configured to collect fluid dispensed from the first shower outlet and the second shower outlet. The recirculating shower system may include a fresh fluid conduit fluidly coupled to the second fluid chamber and configured to provide a fresh fluid to the second fluid chamber. The first shower outlet may be configured to dispense the collected fluid and the second shower outlet may be configured to dispense the fresh fluid. The first fluid chamber may be separate from the second fluid chamber.

One embodiment of the present disclosure relates to a recirculating shower system that includes a showerhead including a plurality of outlets. The recirculating shower system may include a receptacle operably coupled to the showerhead and configured to collect fluid dispensed from the plurality of outlets. The recirculating shower system may include a first fluid conduit fluidly coupled to a first outlet of the plurality of outlets and a second fluid conduit fluidly coupled to the receptacle and to a second outlet of the plurality of outlets. The recirculating shower system may include a heat exchanger. The first fluid source may be configured to provide fresh fluid to the first outlet and the second fluid source may be configured to provide recirculated fluid to the second outlet. The heat exchanger may be configured to exchange heat between the relatively hot fresh fluid from the first fluid conduit and the relatively cool recirculated fluid from the second fluid conduit.

The foregoing summary is illustrative only and is not intended to be in any way limiting. In addition to the illustrative aspects, embodiments, and features described above, further aspects, embodiments, and features will become apparent by reference to the following drawings and the detailed description.

BRIEF DESCRIPTION OF THE FIGURES

The disclosure will become more fully understood from the following detailed description, taken in conjunction with the accompanying figures, wherein like reference numerals refer to like elements, in which:

FIG. 4 is a top view of a portion of the recirculating shower system of FIG. 2 near the shower tray.

FIG. 5 is a perspective views of alternative shower tray designs, which can be used within the recirculating shower system of FIG. 2, according to another exemplary embodiment.

FIG. 6 is a perspective view of a portion of the recirculating shower system of FIG. 2 near a sump assembly.

FIG. 7 is a top view of a portion of the recirculating shower system of FIG. 2.

FIG. 8 is a flow diagram illustrating operations carried out by the recirculating shower system of FIGS. 1 and 2, according to an exemplary embodiment.

DETAILED DESCRIPTION

Figure 1:
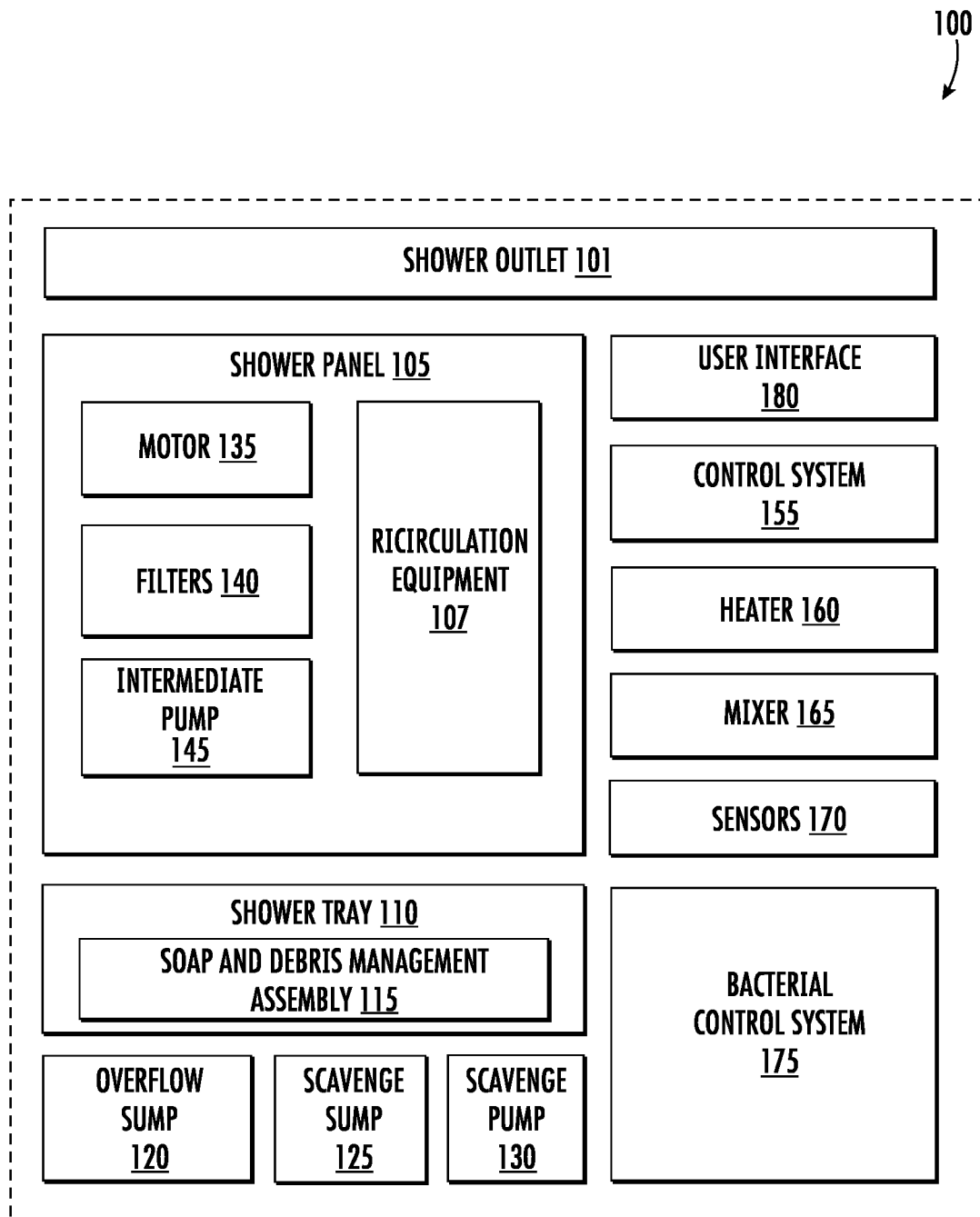
FIG. 1 is a schematic representation of a recirculating shower system, according to an exemplary embodiment.

Before turning to the figures, which illustrate certain exemplary embodiments in detail, it should be understood that the present disclosure is not limited to the details or methodology set forth in the description or illustrated in the figures. It should also be understood that the terminology used herein is for the purpose of description only and should not be regarded as limiting.

Referring generally to the figures, in various embodiments, a recirculating shower system includes at least one shower outlet, a shower panel fluidly coupled to the shower outlet, a shower tray, and a soap and debris management assembly. The shower panel may be configured to house water recirculation equipment within a showering space (e.g., a corner). In various embodiments, the shower panel may facilitate access to shower control components for ease of installation and/or servicing. The shower panel may also be designed to serve as an aesthetic cover to obscure potentially unsightly shower control components. In various embodiments, the shower control components may include, but are not limited to one or more pumps, motors, filters, DTV prompt, etc. In various embodiments, the shower panel may be removably coupled to the region within the shower via one or more hinges or latches.

In various embodiments, the shower tray ("receptor") may be in operative communication with the shower panel and is configured to collect water dispensed from a water source (e.g., shower head). In various embodiments, the recirculating shower system may include a central controlling mechanism to facilitate operatively linking the shower tray with a sump, the shower panel, and/or other shower components. In various embodiments, the shower tray may be customizable.

In various embodiments, the recirculating shower system may be configured to dispense fluid collected in the shower tray at a predetermined rate. In various embodiments, the recirculating shower system may be configured to dispense fluid collected in the shower tray such that the water in the shower tray is fully replaced within a specified amount of time (e.g., 10 seconds, 20 seconds, 30 seconds, etc.).

In various embodiments, the recirculating shower system may include a soap and debris management assembly. The soap and debris management assembly may be configured to monitor and/or remove soap and debris from water collected from the shower tray, facilitate treatment of the collected water, and enable recirculation of the collected and treated water. In various embodiments, soap and/or debris removal may be based, at least in part, on one or more characteristics associated with a water flow from a top surface of the shower tray to a recirculation sump, and an overflow drain point. In various embodiments, the one or more characteristics may include, but are not limited to, soap content (e.g., amount of foam generation, etc.), and debris (e.g., hair, dirt, etc.). In various embodiments, the soap and debris removal assembly may be configured to minimize how much foam and/or debris is generated, how foam and/or debris can be minimized, and/or how foam and/or debris can be removed. In various embodiments, the recirculating shower system may include a large periphery that directs soapy water to flow in a thin layer over an edge on a top surface of the shower tray and into a hidden water handling channel that subsequently directs it to the overflow sump and/or into a scavenge pump sump. The large periphery, which causes the thin flow layer, enables foam and/or bubbles to be carried out of sight of a shower user and into the overflow sump. In various embodiments, the shower tray includes a lid (i.e., standing area for a user) that may be angled to complement the hidden water handling channel.

In various embodiments, the recirculating shower system may include an intermediate pump that is integrated between the shower tray and the shower panel. In various embodiments, the intermediate pump may be a standard pump or it may be a bespoke pump, specially configured and customized for a particular system. In various embodiments, the intermediate pump may initiate a scavenging operation to facilitate recirculating collected water. In various embodiments, the intermediate pump may initiate the scavenging operation at the bottom of the shower sump. In various embodiments, the intermediate pump may remain accessible while in use to facilitate installation and/or servicing.

In various embodiments, the recirculating shower system may include a water control system. The water control system may facilitate water-related measurements and automatic control of water-related metrics. In various embodiments, the control system may provide automatic responses to manage and maintain water cleanliness based on measured levels of water contamination and/or water clarity. In various embodiments, the automatic responses may be based on threshold values of water contamination and/or water clarity. In some embodiments, the threshold values may be user-defined, manufacturer-defined, or a combination thereof. In various embodiments, the control system may be configured to measure water turbidity. In some embodiments, the control system may be operatively coupled to a water turbidity sensor (e.g., in-line sensor, etc.) to facilitate water monitoring. In some embodiments, the control system may be configured to cause removal of soiled water from the recirculating shower system based on a water-related measurement or sample (e.g., water turbidity). In various embodiments, the control system may facilitate measurement and mitigation of various human borne contaminants (e.g., soap, gels, etc.). In various embodiments, the control system may facilitate acid testing and/or treatment of water within the recirculating shower system. In some embodiments, the control system may include one or more drain-down and/or refresh cycles, which facilitate enhanced water cycling and, consequently, enhanced user experience by reducing user need to self-monitor a condition of dispensed water during use. In various embodiments, the control system and operations may be customizable based on user and/or manufacturer preferences.

In various embodiments, the recirculating shower system may include an ozone generator to facilitate disinfected recirculating shower system. In various embodiments, the ozone generator may be coupled to the recirculating shower system such that fresh water (e.g., from a cold water manifold, mixing valve, etc.) may be injected with ozone to facilitate disinfecting the water of bacteria, viruses, or other contaminates.

In various embodiments, the recirculating shower system may include a self-heating unit or may have self-heating capabilities associated with one or more components. In various embodiments, one or more heaters may be in fluid communication with water collected by the overflow sump and/or scavenge sump pump. In other embodiments, the recirculating shower system may include a controllable mixer for controlling a temperature of collected and treated water dispensed from a water source (e.g., showerhead). In some embodiments, the controllable mixer and/or the one or more heaters may operate based on one or more predetermined temperature settings. In various embodiments, the predetermined temperature settings may be based on a user-defined temperature set point, a manufacturer-defined set point, or a combination thereof. In various embodiments, the recirculating shower system may implement self-heating capabilities (e.g., via the one or more heaters and/or the controllable mixer) during a pre-shower warm up. In various embodiments, the pre-shower warm up may cause the recirculating shower to self-heat until at least one of a time and temperature set point is reached. In various embodiments, the recirculating shower may be configured to operate in response to manual and/or automated commands (e.g., AI).

In various embodiments, the recirculating shower system may include a plurality of shower outlets each in fluid communication with a plurality of fluid sources (e.g., via a conduit). In various embodiments, the recirculating shower system may include two or more showerheads for dispensing the plurality of fluid sources (e.g., via a conduits). In other embodiments, the recirculating shower system may include one showerhead that includes multiple subsets of outlets each in fluid communication with the plurality of fluid sources (e.g., via a conduits). In various embodiments, the plurality of outlets may be configured such that the fluids from the plurality of fluid sources (e.g., via a conduits) do not mix (e.g., combine, touch, etc.) upstream of the plurality of outlets (e.g., prior to dispensing from the showerhead). In these embodiments, the plurality of fluid sources may be mixed within the air of the recirculating shower system (e.g., simultaneously dispensed to a user). In other embodiments, one or more of the fluids from the plurality of fluid sources (e.g., via a conduits) may mix (combine, touch, etc.) upstream of the plurality of outlets (e.g., prior to dispensing from the showerhead). In various embodiments, the recirculating shower system may include two or more fluid sources (e.g., via conduits) of the plurality of fluid sources configured such that the fluid sources create a heat exchanger relative to one another at a location upstream of the showerhead. By way of example, two fluid sources (e.g., piping systems, conduits) may be configured such that a first fluid source (e.g., conduit, piping, etc.) is surrounded by a second fluid source (e.g., conduit, piping, etc.) and a first fluid of the first fluid source flows in a direction opposite a second fluid of the second fluid source. By way of example, two fluid sources (e.g., fluid within conduits, piping systems) may be configured such that a first fluid source (e.g., conduit, piping, etc.) is surrounded by a second fluid source (e.g., conduit, piping, etc.) and a first fluid of the first fluid source flows in a parallel direction of a second fluid of the second fluid source. Accordingly, the first fluid conduit and the second fluid conduit may be configured to exchange heat.

In various embodiments, the recirculating shower system may include one or more mode controllers (e.g., knob, button, switch, etc.) configured for a user to switch between a first, second, or third operating mode. In these embodiments, the first operating mode may include the plurality of outlets only dispensing a first fluid, the second operating mode may include the plurality of outlets only dispensing a second fluid, and the third operating mode may include the plurality of outlets dispensing a combination of the first and the second fluids.

In various embodiments, the self-heating capabilities may include management and draw off of cold water in supply pipes (which are fluidly coupled to the controllable mixer). In various embodiments, the recirculating shower system may be configured to automatically purge cold and/or tepid water within a water recirculation loop. The automatic purge causes shower outlets or water supplies (e.g., overhead showers, hand-held showers, body sprays, etc.) to be brought to a correct temperature (as predetermined by a user or based on a manufacturer setting) prior to a time when the user steps into the shower space. As the cold/tepid water is preemptively purged from the recirculation loop prior to the start of the shower, water waste is reduced as water is not unnecessarily dispensed from the shower outlet while the water is being warmed. In various embodiments, the self-heating capabilities may be determined based on one or more predetermined selections or based on a selections offered by customizable user interface (e.g., touch screen).

In various embodiments, the recirculating shower system may be configured for retrofitting into existing showering spaces. In various embodiments, the recirculating shower system may facilitate collection, treatment, and recirculation of water in conventional, single showering spaces (e.g., in a home, hotel etc.). In various other embodiments, the recirculating shower system may be adapted for larger, multiple showering spaces (e.g., in a gym, locker room, dormitory, etc.). In various embodiments, the recirculating shower system may include or be fluidly coupled to a hand shower, overhead spray, and/or body jets. In various embodiments, the recirculating shower system may be configured such that all included components are structurally integrated onto one chassis.

In various embodiments, the recirculating shower system may include one or more bacterial control systems. As the recirculating shower system draws used water from a shower sump (e.g., overflow sump and/or scavenge sump), there is potential for bacterial growth within the recirculating shower system and/or its associated parts. Accordingly, in various embodiments, the recirculating shower system may include a chemical dosing unit to facilitate bacterial control. In some embodiments, the chemical dosing unit may facilitate periodic cleansing of the recirculating shower system with a biocide. In various embodiments, the recirculating shower system may be configured to adapt to existing chemical dosing systems with existing biocides (e.g., SQ53 supplied by JVS). In various embodiments, bacterial control system may be configured to treat internal surfaces and components of the recirculating shower system. In various embodiments, the bacterial control system may include one or more filter cartridges. In some embodiments, the one or more filter cartridges may include a silver-laced filter to enhance antibiotic functionalities. In other embodiments, the bacterial control system may be configured to introduce a chemical agent (e.g., biocide, fungicide) into the shower space (e.g., shower enclosure) via a misting spray.

In various embodiments, the recirculating shower system may include one or more components to facilitate drainage. In some embodiments, the recirculating shower system may be configured to completely drain the shower tray of any used water once the recirculating shower system ceases operation (e.g., water turns off, pump turns off, etc.). In various embodiments, the recirculating shower system may be operated and/or controlled by software and/or control algorithms (e.g., water clarity control, etc.).

Turning now to the accompanying drawings and referring specifically to FIG. 1, a schematic representation of a recirculating shower system is shown according to an exemplary embodiment. As shown in FIG. 1, recirculating shower system 100 includes a shower outlet 101 for dispensing water within a shower space (e.g., shower enclosure), a shower panel 105 for housing recirculating equipment 107 within a shower space, and a shower tray 110 for collecting used water within the shower space. The recirculating shower system 100 may also include one or more sumps including, but not limited to, overflow sump 120 and scavenge sump 125. In various embodiments, overflow sump 120 and scavenge sump 125 may be the same sump. In various embodiments, the recirculating shower system 100 may include a separate recirculation sump fluidly connected to the overflow sump 120 and/or the scavenge sump 125. In various embodiments, overflow sump 120 is disposed below the shower tray 110 and collects used water directed out of the shower tray 110. In various embodiments, used water is directed out of the shower tray 110 via a periphery that causes water to flow in a thin layer over a top surface of the shower tray 110 and into the overflow sump 120 and/or the scavenge sump 125.

As shown in FIG. 1, the shower tray 110 may also include a soap and debris management assembly 115, which is configured to facilitate control and management of human-borne contaminants, including soap and debris, that may be generated or introduced (directly or inadvertently) by a user within the shower space. In various embodiments, the soap and debris management assembly 115 may be configured to determine how much soap (e.g., foam) is generated or present and determine how it can be minimized and/or effectively removed. The soap and debris management assembly may implement one or more chemical and/or mechanical water treatments, including but not limited to, acid treatments, antibacterial treatments, filters The shower tray 110 may also include a channel, through which collected water may be directed to the overflow sump 120 and/or scavenge sump 125. In various embodiments, the shower tray 110 may include a specialized topography—such as various angles, slopes, and/or contours—to facilitate directed collected water away from the shower tray 110. The recirculating shower system 100 may also include a scavenge pump 130 to pump collected water from at least one of the overflow sump 120 and the scavenge sump 125 to the recirculation equipment 107.

As shown in FIG. 1, the shower panel 105 may include at least one motor 135 configured to drive at least one of the scavenge pump 130 and/or an intermediate pump 145 (to pump water through recirculation equipment 107). The shower panel 105 may also include one or more filters 140, which may remove various contaminants from recirculated water. As shown, the recirculating shower system 100 may also include a control system 155, which is configured to manage and control operations related to recirculation of water dispensed and collected within the shower space. In various embodiments, the control system 155 may be operatively coupled to one or more heaters 160, mixers 165, and/or sensors 170. In various embodiments, the one or more heaters 160 may be disposed within or separate from (but operatively coupled to) the shower panel 105. The one or more heaters 160 may facilitate heating water pumped from the overflow sump 120 and/or scavenge sump 125 for eventual output through the shower outlet 101. Mixer 165 may be controlled by the control system 155 and may facilitate moderating a temperature of recirculated water flowing through the recirculating shower system 100. In various embodiments, the control system 155 may be configured to enable a self-heating operation of the recirculating shower system 100, wherein at least one of the intermediate pump 145 and the scavenge pump 130 may purge cold/tepid water from within the recirculation equipment 107 and initiate warming of recirculated water prior to dispensing of the water through the shower outlet 101. In various embodiments, control system 155 may control operations within recirculating shower system 100 based on one or more inputs from one or more communicatively coupled sensors 170, which may be configured to detect a water flow turbidity, a water contamination level, a water temperature, or any other relevant metric related to water flow within the recirculating shower system 100.

Recirculating shower system 100 may also include a bacterial control system 175, which may include one or more chemical dosing units to facilitate cleansing of surfaces and components within the recirculating shower system 100. In various embodiments, the bacterial control system 175 may include one or more biocides, fungicides, and/or other chemical agents to enable cleaning of the recirculating shower system 100.

Finally, as shown in FIG. 1, the recirculating shower system 100 may include a user interface 180, which may be operatively coupled to the shower panel 105, the control system 155, and/or bacterial control system 175. The user interface 180 may enable setting of operation thresholds (e.g., temperature set points, water flow ranges, etc.) within the recirculating shower system 100.

Figure 2:
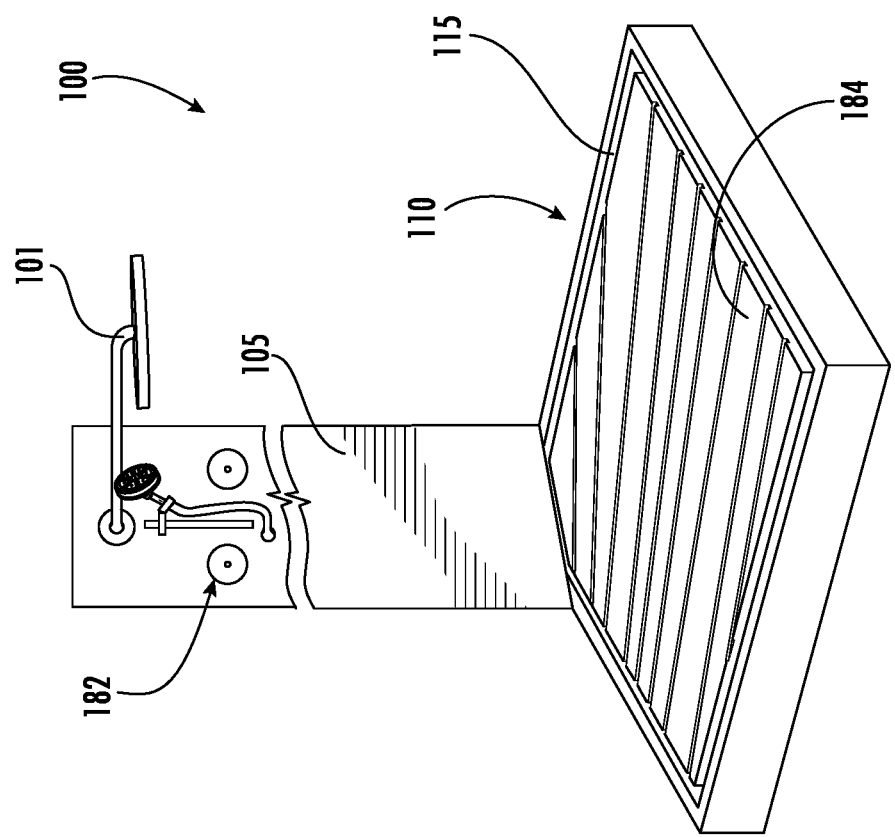
FIG. 2 is a perspective view of a portion of a recirculating shower system, according to an exemplary embodiment.

FIG. 2 shows a perspective view of recirculating shower system 100 according to an exemplary embodiment. As shown, the recirculating shower system 100 may be disposed within a shower space and include shower outlet 101 (e.g., shower head, hand-held outputs, jets, etc.), shower panel 105, and fluidly coupled shower tray 110. As shown, shower panel 105 may be mounted within a corner or area of a shower space that may be configured to house various components related to control of the recirculating shower system 100 (e.g., recirculation equipment 107, motor 135, filters 140, intermediate pump 145, etc.). As shown in FIG. 2, shower panel 105 may also facilitate access to additional controls 182 associated with recirculating shower system, which may include, but are not limited to, knobs and/or interfaces to facilitate changing a temperature of water. According to another exemplary embodiment, the additional controls 182 may include features providing the user of the shower with the ability to turn on or off the recirculating features of the shower (e.g., to toggle between a showering experience that utilizes only fresh water and a showering experience that uses both fresh water and recirculated water).

As shown in FIG. 2, shower tray 110 includes soap and debris management assembly 115. In various embodiments, soap and debris management assembly 115 may include one or more channels disposed within the shower tray. As shown, the channels of the soap and debris management assembly 115 are disposed substantially along a perimeter of the shower tray 110 and surrounding a standing area 184, on which a user may stand while using the recirculating shower system 100.

Figure 3:
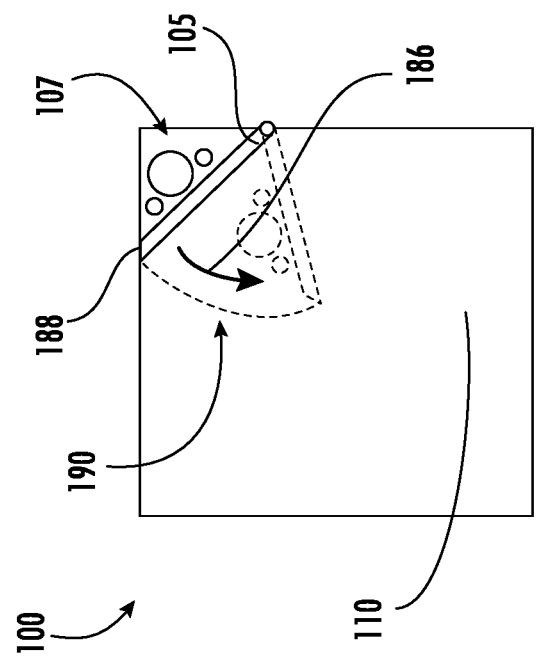
FIG. 3 is a top view of a portion of the recirculating shower system of FIG. 2 near the shower panel.

FIG. 3 shows a top view of the recirculating shower system 100 according to an exemplary embodiment. As shown, shower panel 105 may be mounted on a surface within a shower space that is substantially perpendicular to the shower tray 110. As previously described, the shower panel 105 is configured to house, among other components, water recirculation equipment 107. To facilitate access to such components, the shower panel 105 may be flexibly and/or removably coupled to the shower space. As shown, the shower panel 105 may be coupled to a portion of the shower space via a coupling 188 (e.g., latch, catch, etc.). The shower panel 105 may then be rotated in a direction 186 to enable access to the one or more components, such as recirculation equipment 107, housed within the shower panel 105 in an access region 190. In various other embodiments, shower panel 105 may be removed entirely.

FIG. 4 shows a top view of the recirculating shower system 100 near the shower tray 110. As shown, the shower tray includes one or more channels within the soap and debris management assembly 115, which may be disposed along a perimeter of the shower tray 110 and surrounding standing area 184. Shower tray 110 may also include a central channel 192, which is in fluid communication with the channels of the soap and debris management assembly 115. Water collected within the shower tray 110 within the soap and debris management assembly 115 may flow through the central channel 192 and to sump and valve assembly 195, as shown. Sump and valve assembly 195 may facilitate sending water for subsequent recirculation, draining, or further collection within the shower tray 110. Water flowing through the central channel 192 may flow into a reservoir 196, which collects and directs water to a rotary valve 198. In various embodiments, rotary valve 198 may be manually and/or remotely controlled (e.g., via software). The rotary valve 198 may be fluidly connected to drain 194 and a pump feed chamber 200.

Though FIGS. 2-4 show shower tray 110 as having a rectangular shape, shower tray 110 may have any polygonal shape. FIG. 5 shows shower tray 110 having various other shapes (e.g., circular, semi-circular or partially circular, oval, etc.), according to various other exemplary embodiments.

FIG. 6 shows a perspective view of the sump and valve assembly 195 disposed within shower tray 110 according to an exemplary embodiment. As shown, sump and valve assembly 195 includes reservoir 196, which is configured to collect water at an inlet 203, wherein the collected water is received from central channel 192 and channels of soap and debris management system 115. Collected water within the reservoir 196 remains in a return sump 206 and is controllably directed away from the reservoir 196 based on an operation of the fluidly coupled rotary valve 198. Rotary valve 198 may be controlled to facilitate water flow through one or more ports 209, which may each direct water along one or more flow paths away from the reservoir 196. In various embodiments, the rotary valve 198 may be configured to have three positions: a first position to direct water for subsequent recirculation, a second position for directing water to drain 194, and a third position for directing water for subsequent cleaning (e.g., via filters 140, bacterial control system 175, and/or another treatment system contained within recirculating shower system 100).

FIG. 7 shows a top view of the sump and valve assembly 195, according to an exemplary embodiment. FIG. 7 illustrates first, second, and third water flow paths, which correspond to each of the first, second, and third positions of rotary valve 198, respectively. As shown, first flow path 221 directs collected water to pump inlet 212, wherein water may be pumped (e.g., via intermediate pump 145, scavenge pump 130, and or another pump within recirculating shower system 100) for subsequent recirculation through recirculating shower system 100 and re-dispersal through shower outlet 101. Second flow path 215 may direct collected water to drain 194, wherein water may be drained and removed from the recirculating shower system 100. Third flow path 218 may direct collected water to one or more water treatment systems or assemblies included within the recirculating shower system 100, which include, but are not limited to, the soap and debris management assembly 115, bacterial control system 175, filters 140, an acid testing assembly, etc. In various embodiments, the position of the rotary valve 198, and subsequent determined water flow path, may be based on a measured characteristic associated with the collected water (e.g., water turbidity, water acidity, water soap content, water contaminant levels, etc.).

FIG. 8 shows a flow diagram illustrating a method 300 including various operations carried out by recirculating shower system 100, according to an exemplary embodiment. As shown, clean water may be output from shower outlet 101 in operation 305 for use by a user within a shower space. The water used by the user may be collected within the shower tray 110 in operation 310 and subsequently directed (e.g., via one or more channels) to the reservoir 196 and sump and valve assembly 195 in operation 315. In operation 320, used and collected water may be treated and/or filtered by the soap and debris management assembly 115 and/or by filters 140 to remove contaminants based on a position of the rotary valve 198. In operation 325, water is pumped (e.g., via intermediate pump 145 and/or scavenge pump 130) and recirculated through recirculation equipment 107 (in shower panel 105) and readied for re-dispensing through the shower outlet 101. In various embodiments, control system 155 may initiate a self-heating operation which causes cold/tepid water to be pumped (e.g., via intermediate pump 145) out of recirculation lines (e.g., within recirculation equipment 107) in operation 330. Newly recirculated water is then heated (e.g., via a heater 160) in operation 335 prior to operation of recirculating shower system 100 by a user. In various embodiments, after a predetermined amount of time or water recirculation cycles, or after predetermined number of uses by a user, bacterial control system 175 may initiate cleansing of surfaces and components within recirculating shower system 100.

Figure 9:
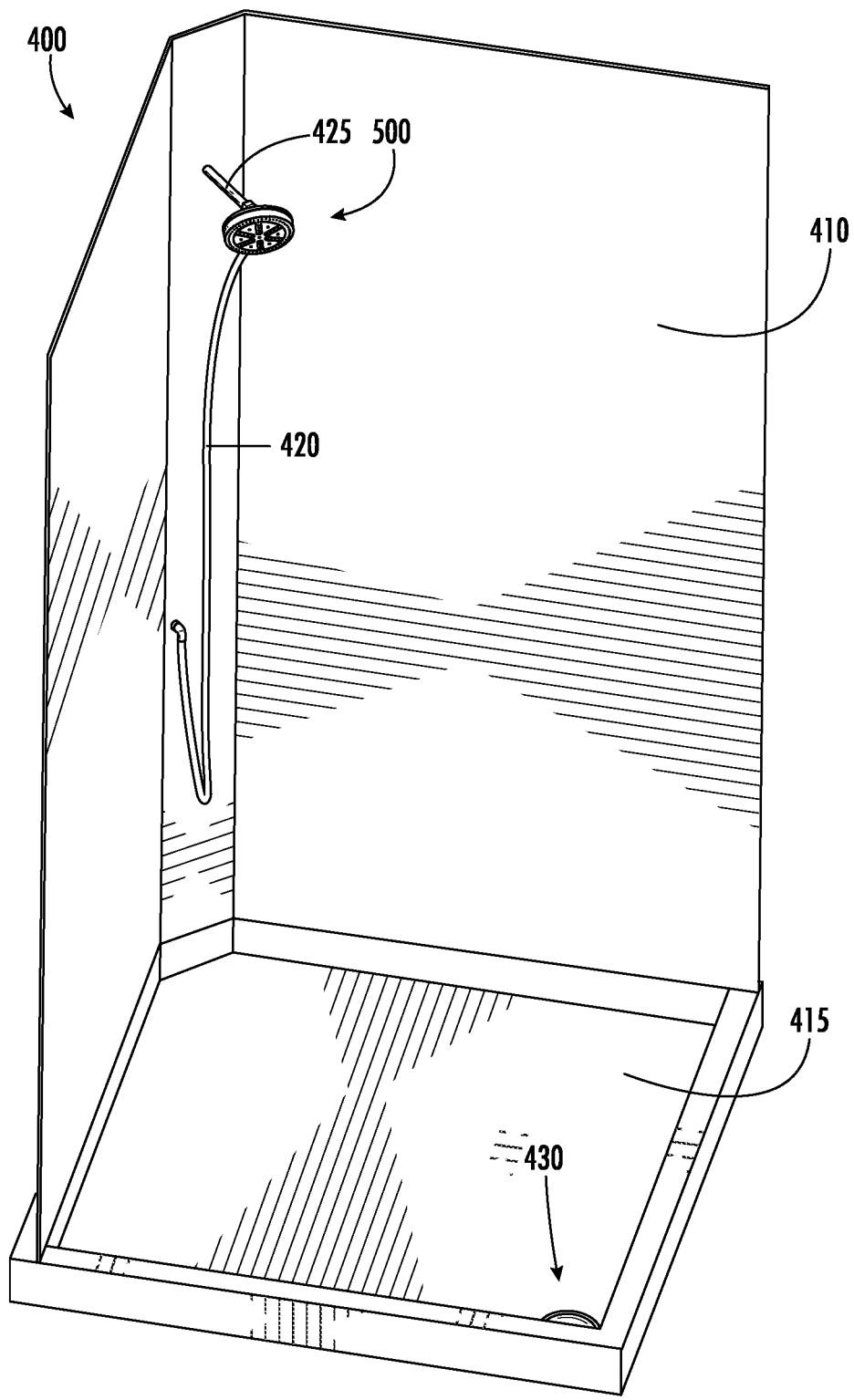
FIG. 9 is a perspective view of a portion of a recirculating shower system, according to an exemplary embodiment.

FIG. 9 shows a perspective view of a recirculating shower system 400, according to an exemplary embodiment. As shown, the recirculating shower system 400 may include a showerhead 500 fluidly coupled to a recirculated fluid pipe or conduit 425 and a fresh water fluid pipe or conduit 420. In various embodiments, the recirculating shower system 400 may include a shower wall 410 (e.g., panel, enclosure, etc.). The shower wall 410 may be mounted within a corner or area of a shower space and may be configured to house various components related to the recirculating shower system 400 (e.g., the recirculated fluid conduit 425, the fresh water conduit 420, controls, etc.). As shown in FIG. 9, the recirculating shower system 400 may include a receptacle 415 (e.g., tray, tub, reservoir, etc.) for collecting fluid from the showerhead 500. In various embodiments, the receptacle 415 may be operably coupled to the showerhead 500 such that fluid dispensed from the showerhead 500 is collected within the receptacle 415 and is expelled through a drain 430. In various embodiments, the drain 430 may be flush with the receptacle 415. In various other embodiments, the drain 430 may be positioned on top of or underneath the receptacle 415. In various embodiments, the drain 430 may include one or more features to prevent blockage of fluid to the drain 430. For example, the drain 430 may include a cover to prevent a user from blocking the drain 430 with their foot. In other embodiments, the drain 430 may be sized to prevent a user from blocking the drain 430 (e.g., larger than the average width of a human foot).

Figure 10:
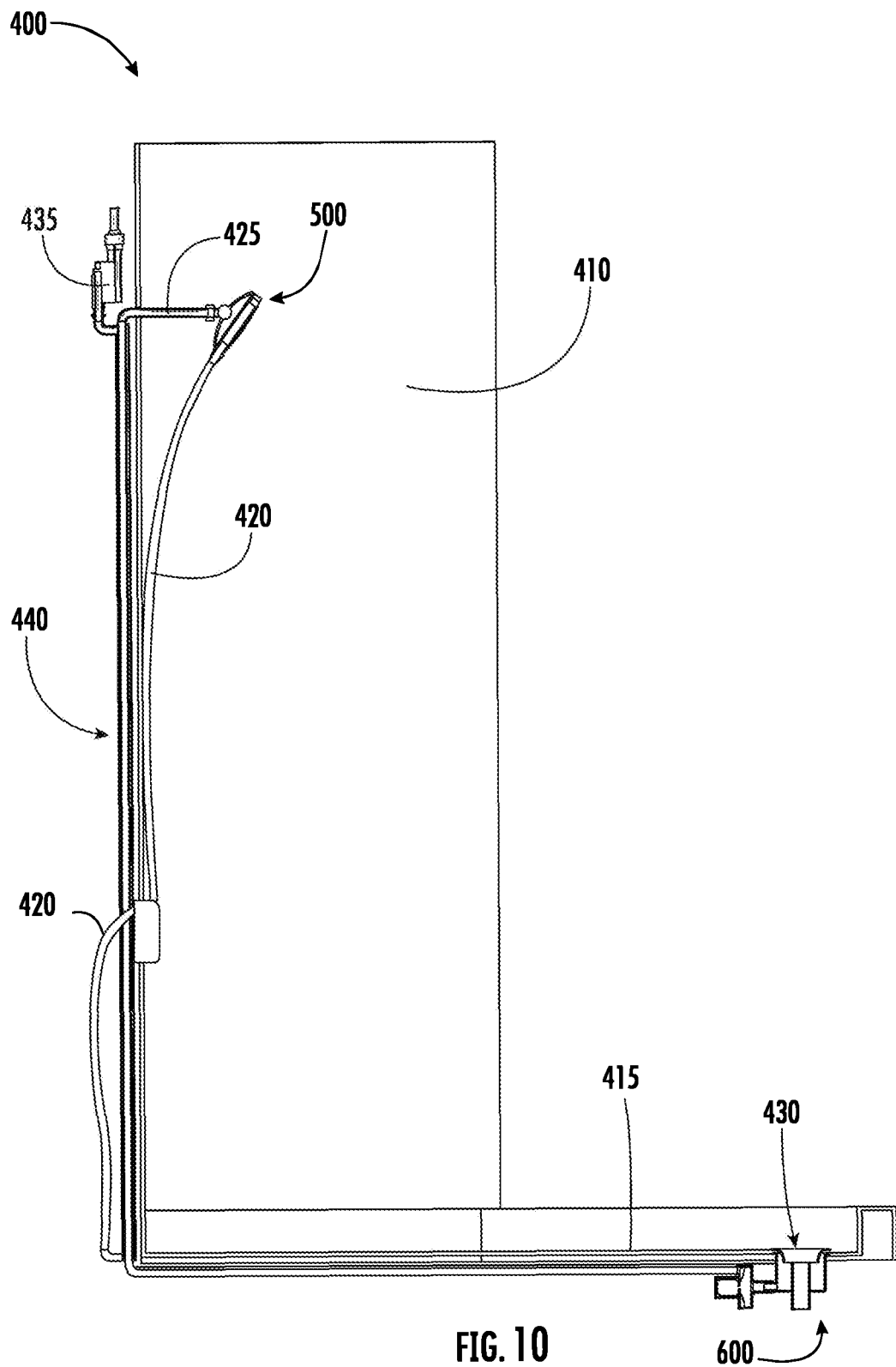
FIG. 10 is a side view of a portion of the recirculating shower system of FIG. 9, according to an exemplary embodiment.

FIG. 10 shows a side view of the recirculating shower system 400, according to an exemplary embodiment. As shown in FIG. 10, the fresh water conduit 420 may be coupled to one or more mixers 435. In various embodiments, the mixer 435 may be configured to receive hot water from a hot water fluid source (e.g., from a water manifold) and cool water from a cool water fluid source (e.g., from a water manifold). The mixer 435 may be configured to mix the hot water and the cool water to accommodate various temperatures of fluid expelled through the showerhead 500. In various embodiments, the mixer 435 may be configured to accommodate a temperature based on a user input (e.g., via a knob, handle, user interface 180, etc.). In various embodiments, the mixer 435 may be configured to accommodate a temperature based on one or more temperature sensors, as discussed in greater detail below. In various other embodiments, the recirculating shower system 400 may not include a mixer 435, such that the showerhead 500 receives fluid directly from a water manifold system.

As shown in FIG. 10, the recirculating shower system 400 may include a recirculating pump assembly 600 operably coupled to the drain 430. As discussed in greater detail below, in various embodiments, the recirculating pump assembly 600 may be configured to receive collected fluid within the receptacle 415 via the drain 430. In various embodiments, the recirculating pump assembly 600 may be configured to pump the collected fluid away from the drain 430 and back to the showerhead 500. For instance, as shown in FIG. 10, the recirculating pump assembly 600 may be operably coupled with the recirculated fluid conduit 425 such that the collected fluid received from the drain 430 can be recirculated back to the showerhead 500.

As shown in FIG. 10, the recirculating shower system 400 may include a portion that is configured as a heat exchanger 440. In various embodiments, the heat exchanger 440 includes an outer fluid pipe or conduit that encloses an inner fluid pipe or conduit. In various embodiments, a portion of the fresh water conduit 420 (shown as outer pipe 450 in FIG. 11) may enclose (e.g., surround, receive, etc.) a portion of the recirculated fluid conduit 425, as discussed in greater detail below. Warmer water flowing through the fresh water conduit 420 may then be utilized to warm cooler water flowing through the recirculated fluid conduit 425. It should be noted that while the embodiments shown herein illustrate a situation where the fresh water fluid conduit has a portion of the recirculated fluid conduit therein, the reverse may be true according to other exemplary embodiments (e.g., the recirculated fluid conduit may contain a portion of the fresh water fluid conduit therein).

In various embodiments, the recirculating shower system 400 may be configured to completely refresh the fluid within the system 400 within a predetermined time. For instance, in various embodiments, the flow rate of the fresh water dispensed through the showerhead 500 (e.g., from the fresh water conduit 420) may be less than the flow rate of the recirculated fluid pumped through the recirculated fluid conduit 425 and dispensed through the showerhead 500 such that fluid is constantly being recirculated through the system 400. By way of example, the showerhead 500 may be configured to dispense fresh water at a flow rate of 2 liters per minute. The total volume of fluid within the system 400 may be about 1 liter. Accordingly, in this embodiment, the system 400 is configured to completely refresh the fluid within the system 400 within about 30 seconds. In various other embodiments, the flow rate of the fresh water and recirculated fluid may differ.

Figure 11:
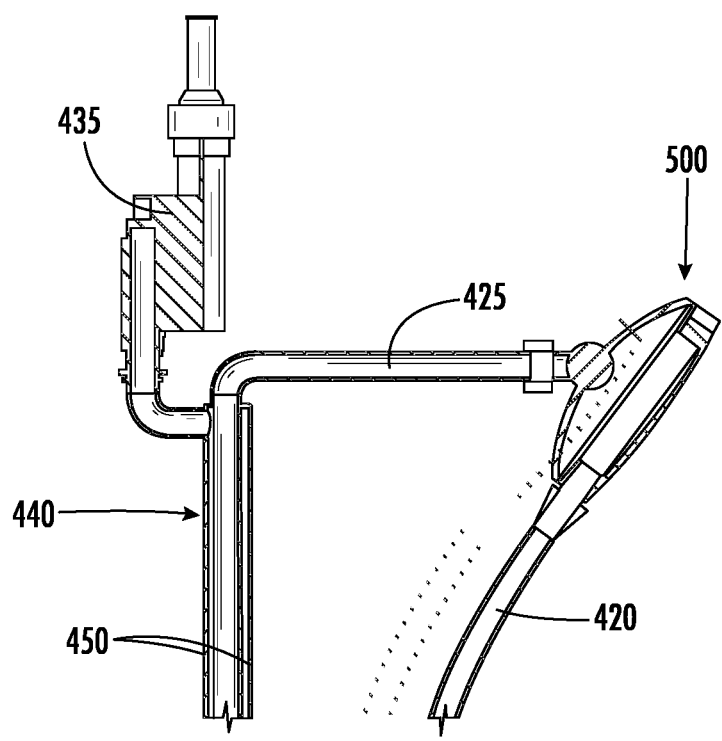
FIG. 11 is a side view of a portion of the recirculating shower system of FIG. 9, according to an exemplary embodiment.

As shown in greater detail in FIG. 11, the outer pipe 450 may be configured to receive fresh water from a fresh water source (e.g., from the mixer 435 or directly from a fluid manifold). The outer pipe 450 can completely enclose a portion of the recirculated fluid conduit 425. In various embodiments, the recirculated fluid conduit 425 may include one or more pipes made from various metallic or non-metallic materials (e.g., copper, plastic, aluminum, etc.). In various embodiments, the outer pipe 450 may include one or more pipes made from various metallic or non-metallic materials (e.g., plastic, PVC, aluminum, copper, etc.). As described in greater detail below, the outer pipe 450 can be sealed around a portion of the recirculated fluid conduit 425 such that fluid flowing within the outer pipe 450 (e.g., fresh water) can flow between the outer pipe 450 and the enclosed portion of the recirculated fluid conduit 425. Accordingly, the fluid within the outer pipe 450 (e.g., fresh water) and the portion of the recirculated fluid conduit 425 can be configured to directly contact (e.g., fluid surrounds conduit 425) such that heat can be exchanged between the relatively hot fresh water flowing through the outer pipe 450 and the relatively cool recirculated fluid flowing through the recirculated fluid conduit 425.

As shown in FIGS. 10 and 11, the recirculating shower system 400 may be configured such that the relatively hot fresh water within the outer pipe 450 and the relatively cool recirculated fluid within the recirculated fluid conduit 425 flow in opposing directions. For instance, the relatively hot fresh water provided by the mixer 435 may flow through the outer pipe 450 and be received through the fresh water conduit 420 by a coupling 455, as discussed in greater detail below. In these embodiments, the relatively hot fresh water flows in a generally downward direction from the mixer 435 (or manifold) towards bottom end of the shower system 400 (e.g., towards the drain 430, towards the receptacle 415, etc.). The recirculating shower system 400 may be configured such that the relatively cool recirculated fluid flows in an opposing direction of the relatively hot water flowing through the outer pipe 450. For instance, as shown in FIGS. 10 and 11, the recirculated fluid can flow from the recirculating pump assembly 600 towards the showerhead 500. In these embodiments, the recirculated fluid flowing within the portion of the recirculated fluid conduit 425 enclosed by the outer pipe 450 can flow in a direction that opposes the flow of the fresh water within the outer pipe 450. According to various other embodiments discussed in greater detail below, the recirculating shower system 400 may be configured such that the relatively hot fresh water and the relatively cool recirculated water flow in the same direction.

Figure 12:
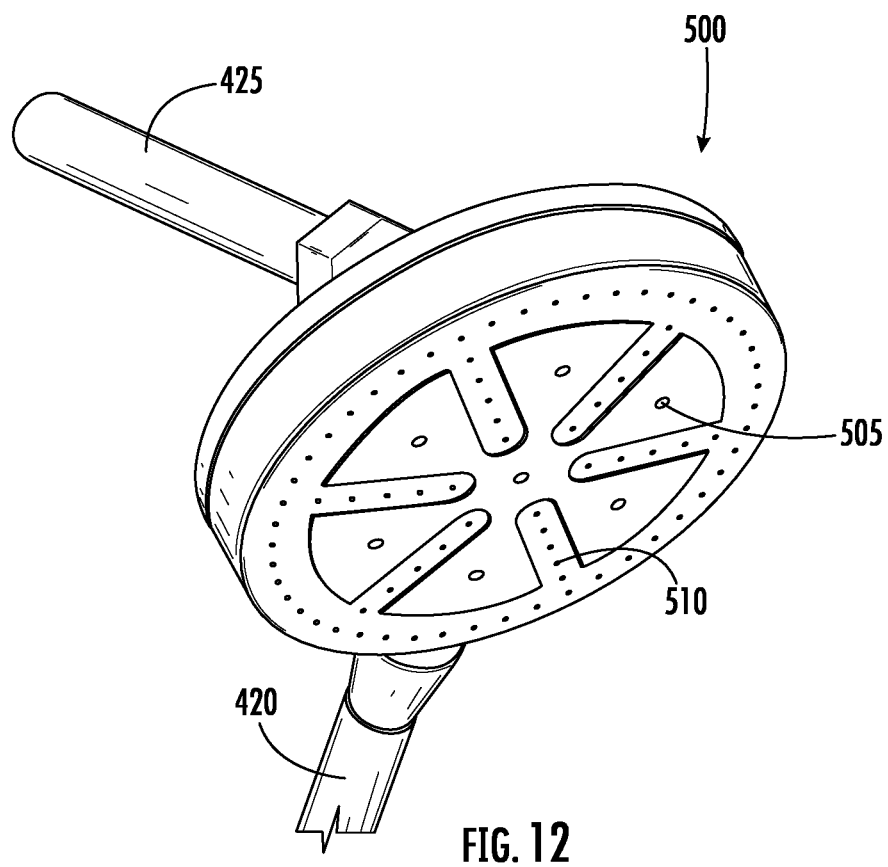
FIG. 12 is a perspective view of a portion of the recirculating shower system of FIG. 9, according to an exemplary embodiment.

FIG. 12 shows a perspective view of the showerhead 500, according to an exemplary embodiment. As shown in FIG. 12, the showerhead 500 may include a plurality of outlets. In various embodiments, the showerhead 500 may include at least one recirculated fluid outlet 505. In various embodiments, the showerhead 500 may include at least one fresh water outlet 510. As shown in FIG. 12, in various embodiments, the recirculated fluid outlets 505 may be larger in size than the fresh water outlets 510. For instance, the recirculated fluid outlets 505 may be larger than the fresh water outlets 510 such that the recirculated fluid outlets 505 can pass (e.g., expel, dispense, etc.) debris such as soap, hair, dirt, or other various blockages. In various other embodiments, the recirculated fluid outlets 505 and the fresh water outlets 510 may be the same size. In various embodiments, the recirculated fluid outlets 505 may be configured to receive fluid from the recirculated fluid conduit 425, as described in greater detail below. In various embodiments, the fresh water outlets 510 may be configured to receive fluid from the fresh water conduit 420, as described in greater detail below.

In various embodiments, the recirculating shower system 400 may be configured to switch between various operating modes. In various embodiments, the recirculating shower system 400 may be configured to receive a user input (e.g., via user interface 180). The recirculating shower system 400 may be configured to switch from one operating mode to a second operating mode based on the user input. For instance, the recirculating shower system 400 may be configured to dispense only recirculated fluid through the recirculated fluid outlets 505 in a first operating mode. The recirculating shower system 400 may be configured to dispense only fresh water through the fresh water outlets 510 in a second operating mode. The recirculating shower system 400 may be configured to dispense both recirculated fluid through the recirculated fluid outlets 505 and fresh water through the fresh water outlets 510 in a third operating mode. In various embodiments, the recirculating shower system 400 may include various components (e.g., valves, knobs or other user inputs, etc.) to facilitate shutting on and/or off the recirculated fluid conduit 425 (e.g., stopping flow of fluid) and/or the fresh water conduit 420 (e.g., stopping flow of fluid).

Figure 13:
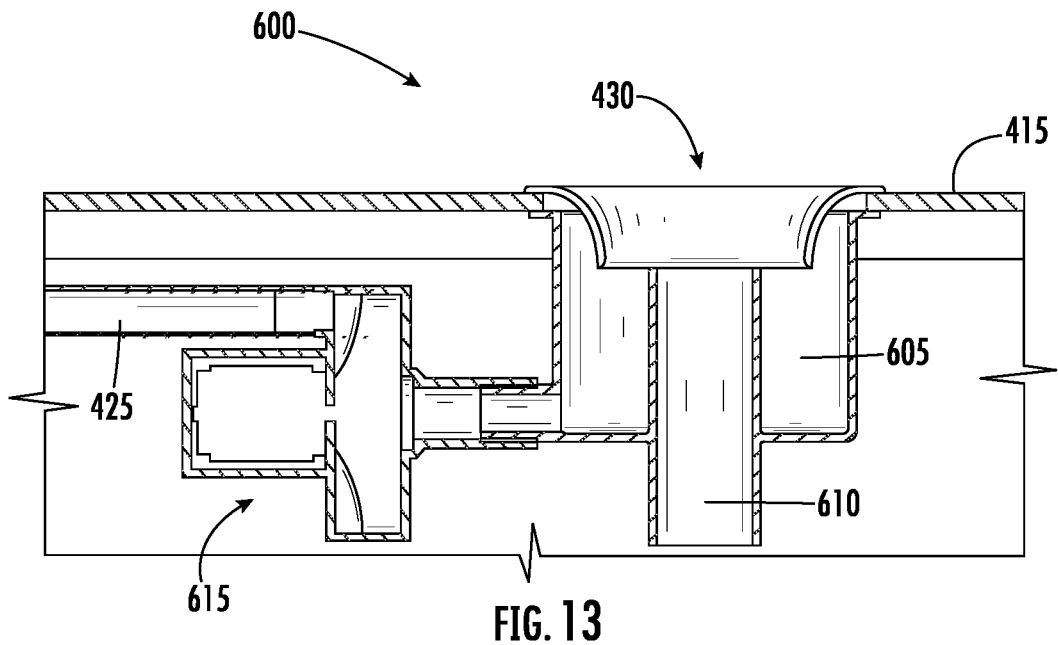
FIG. 13 is a side view of a portion of the recirculating shower system of FIG. 9, according to an exemplary embodiment.

FIG. 13 shows a side view of the recirculating pump assembly 600 according to an exemplary embodiment. As discussed above, the recirculating pump assembly 600 may be configured to facilitate recirculating fluid collected within the receptacle 415. In various embodiments, the recirculating pump assembly 600 may receive the collected fluid and other waste (e.g., soap, dirt, etc.) from the drain 430. In various embodiments, waste may be expelled through a waste outlet 610 within a sump 605, as shown in FIG. 13. A portion of the fluid collected within the sump 605 can be distributed towards a pump 615. The pump 615 may then be configured to pump the collected water through the recirculated fluid conduit 425 to be dispensed back through the showerhead 500. While the exemplary embodiment depicted in FIG. 13 includes one sump 605, one waste outlet 610, and one pump 615, various other embodiments may include more or less sumps 605, waste outlets 610, and pumps 615. In various embodiments, the recirculating pump assembly 600 may include more or less components including, but not limited to, filters, water treatments, and heaters. In various embodiments, the recirculating pump assembly 600 may be positioned in various other locations throughout the recirculating shower system 400.

Figure 14:
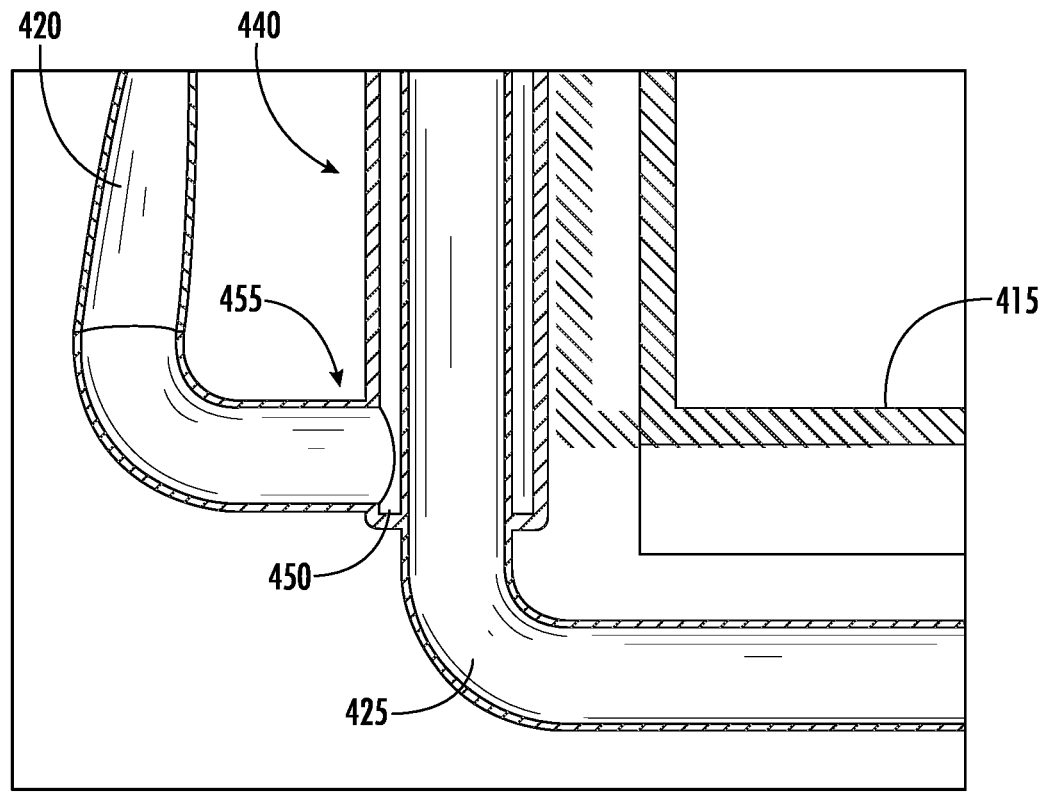
FIG. 14 is a side view of a portion of the recirculating shower system of FIG. 9, according to an exemplary embodiment.

FIG. 14 shows a side view of a portion of the recirculating shower system 400, according to an exemplary embodiment. In particular, FIG. 14 shows a side view of the coupling 455 between the outer pipe 450 and the enclosed portion of the recirculated fluid conduit 425 to form the heat exchanger 440. As discussed above, the recirculated fluid from the drain 430 can be pumped through the recirculated fluid conduit 425 to flow in an upward direction (e.g., in a general direction from the drain 430 to the showerhead 500). The fresh water can be provided by the mixer 435 (or through a water manifold system) to flow in a downward direction (e.g., in a general direction from the mixer 435 towards the receptacle 415). As shown in FIG. 14, the fresh water conduit 420 may be configured to couple to the outer pipe 450 such that the fresh water conduit 420 can receive the fresh water from the outer pipe 450 and dispense the fresh water through the showerhead 500 (e.g., through the fresh water outlets 510). As discussed in greater detail below, the coupling 455 may include several components to seal the outer pipe 450 around the recirculated fluid conduit 425.

Figure 15:
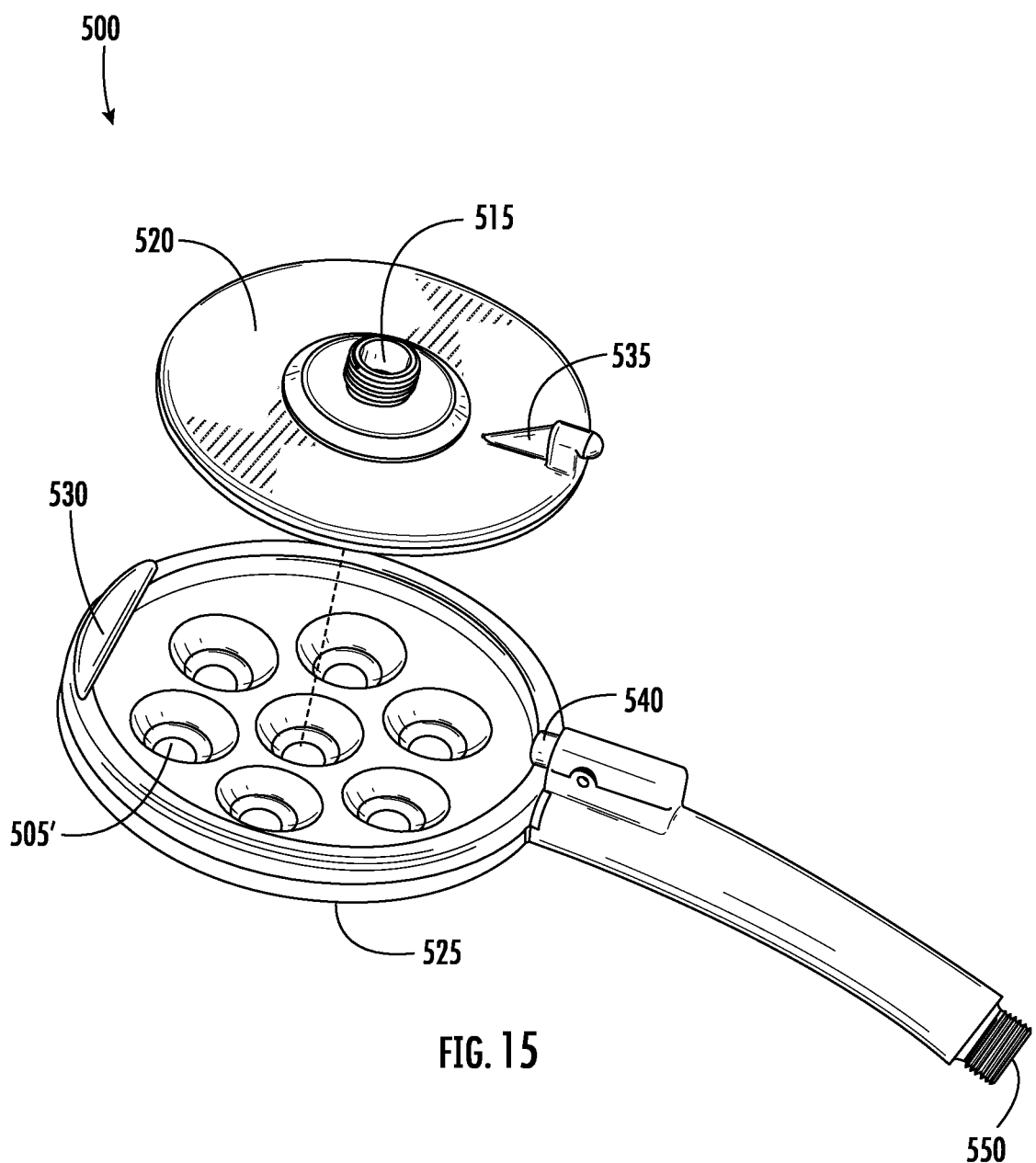
FIG. 15 is a perspective view of a portion of a recirculating shower system, according to an exemplary embodiment.

FIG. 15 shows a perspective view of the showerhead 500, according to an exemplary embodiment. As shown in FIG. 15, the showerhead 500 may include a recirculating fluid portion 520 that may be configured to couple to a fresh water portion 525. In various embodiments, the recirculating fluid portion 520 may be configured to couple to the fresh water portion 525 through one or more retaining clips 530 (e.g., tabs, snaps, clips, etc.). In various embodiments, the showerhead 500 may include a latch retainer 535 and a spring-loaded latch 540, as shown in FIG. 15. In various embodiments, the spring-loaded latch 540 may be configured to receive (e.g., compress, lock, attach, etc.) the latch retainer 535 to facilitate coupling the recirculating fluid portion 520 with the fresh water portion 525. In various embodiments, the recirculating fluid portion 520 may be configured to couple to the fresh water portion 525 through various fasteners (e.g., screws, adhesives, etc.). In various embodiments, the recirculating fluid portion 520 may be integrally formed (e.g., welded, molded, etc.) with the fresh water portion 525.

As shown in FIG. 15, the showerhead 500 may include a recirculated fluid inlet 515. In various embodiments, the recirculated fluid inlet 515 may be configured to couple to the recirculated fluid conduit 425. In various embodiments, the recirculated fluid inlet 515 may be configured to be coupled to the recirculated fluid conduit 425 through various threaded components or fasteners. In various other embodiments, the recirculated fluid inlet 515 may be integrally formed with the recirculated fluid conduit 425. As shown in FIG. 15, the showerhead 500 may include a fresh water inlet 550. In various embodiments, the fresh water inlet 550 may be configured to couple to the fresh water conduit 420. In various embodiments, the fresh water inlet 550 may be configured to couple to the fresh water conduit 420 through various threaded components or fasteners. In various other embodiments, the fresh water inlet 550 may be integrally formed with the fresh water conduit 420.

Figure 16:
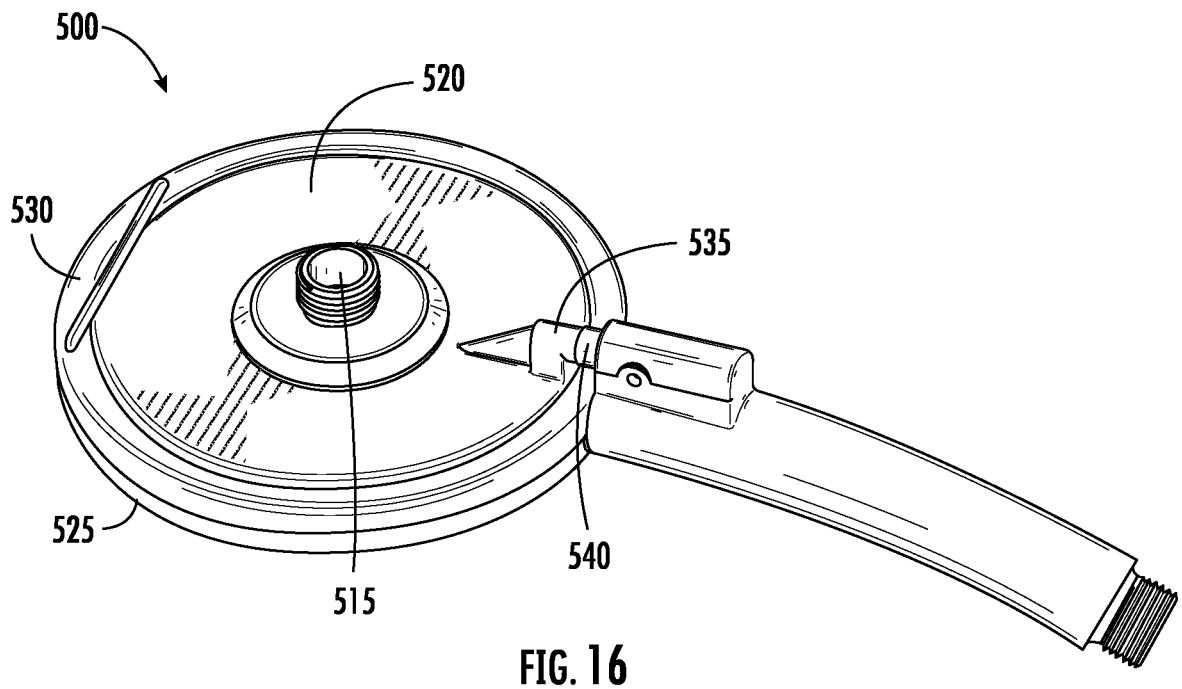
FIG. 16 is a perspective view of a portion of the recirculating shower system of FIG. 15, according to an exemplary embodiment.

FIG. 16 shows a perspective view of the showerhead 500 with the recirculating fluid portion 520 coupled to the fresh water portion 525, according to an exemplary embodiment. A shown in FIG. 16, the recirculating fluid portion 520 may be configured to couple with the fresh water portion 525 such that the two portions form the showerhead 500. In this embodiment, the retaining clip 530 facilitates locking the recirculating fluid portion 520 within the fresh water portion 525 and the spring-loaded latch 540 compresses (e.g., via a spring) to receive the latch retainer 535. In various other embodiments, the recirculating fluid portion 520 and the fresh water portion 525 may be coupled in various other configurations (e.g., via fasteners, welding, molding, adhesives, etc.).

Figure 17:
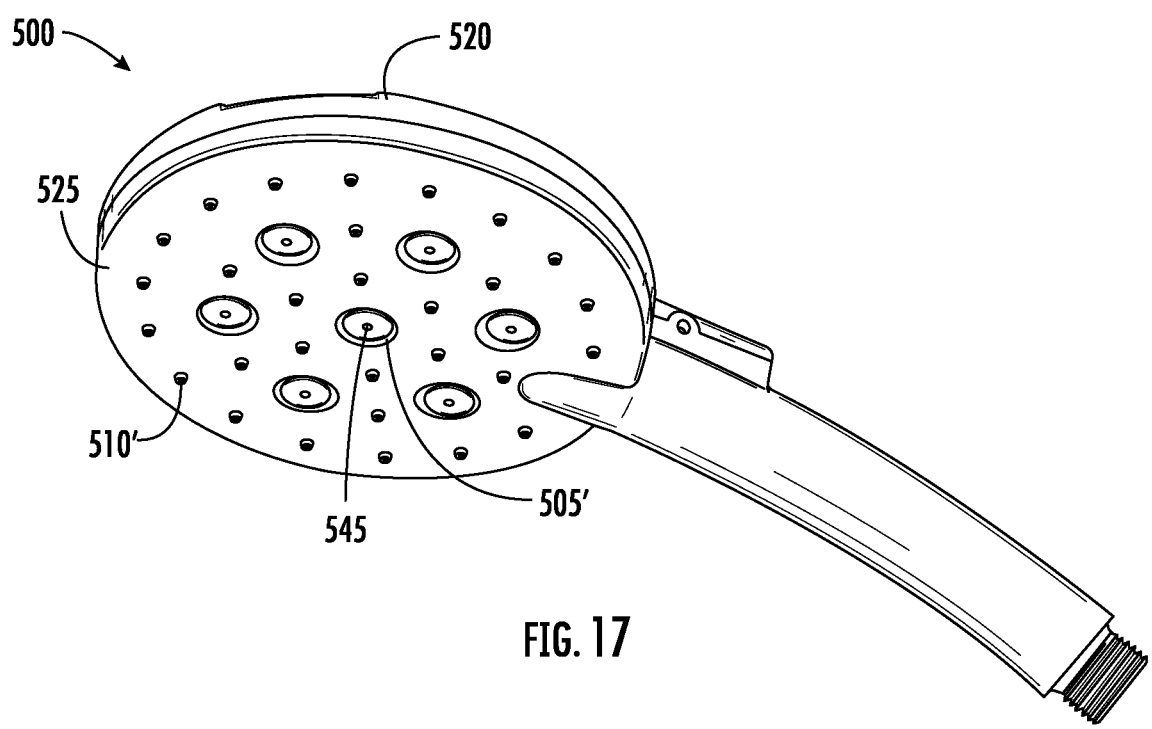
FIG. 17 is a perspective view of a portion of the recirculating shower system of FIG. 15, according to an exemplary embodiment.

FIG. 17 shows an underside perspective view of the showerhead 500 with the recirculating fluid portion 520 coupled to the fresh water portion 525, according to an exemplary embodiment. As shown in FIG. 17, the recirculating fluid portion 520 may be coupled with the fresh water portion 525 such that a recirculated fluid nozzle 545 positioned on the recirculating fluid portion 520 can be positioned within the recirculated fluid outlet 505' on the showerhead 500. In various embodiments, the recirculated fluid nozzles 545 may formed with the recirculating fluid portion 520 (e.g., welded, fastened, molded, etc.) to the recirculating fluid portion 520 and configured to protrude from the recirculated fluid outlets 505', as shown in FIG. 17. In various other embodiments, the recirculated fluid nozzles 545 may be formed (e.g., welded, fastened, molded, etc.) with various other portions of the showerhead 500, such as the fresh water portion 525. In various other embodiments, the showerhead 500 may not include the recirculated fluid nozzles 545 such that recirculated fluid dispenses directly out of the recirculated fluid outlets 505'.

As shown in FIG. 17, the showerhead 500 may be configured such that the fresh water outlets 510' and the recirculated fluid outlets 505' are separate and distinct from one another (e.g., spaced apart). In various embodiments, the showerhead 500 may include more or less fresh water outlets 510' than those depicted in FIG. 17. In various embodiments, the showerhead 500 may include more or less recirculated fluid outlets 505' than those depicted in FIG. 17.

Figure 18:
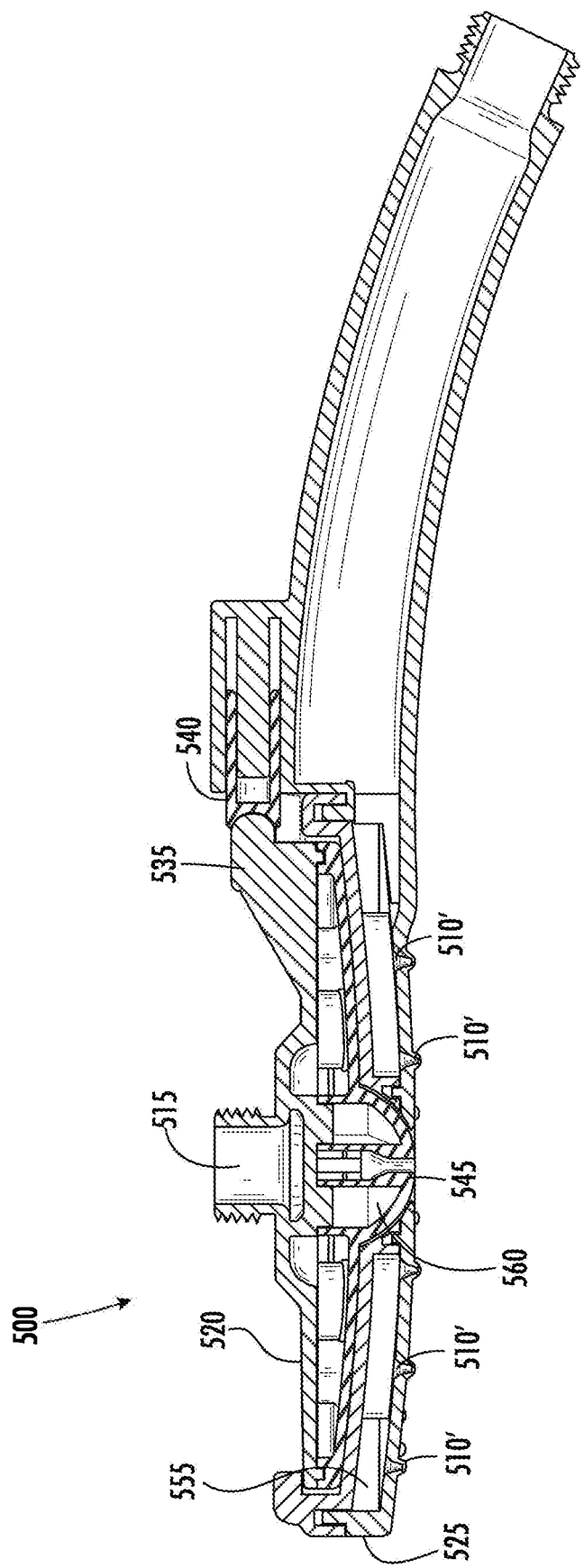
FIG. 18 is a cross-sectional view of a portion of the recirculating shower system of FIG. 15, according to an exemplary embodiment.

FIG. 18 shows a cross-sectional view of the showerhead 500 according to an exemplary embodiment. As shown in FIG. 18, the recirculating fluid portion 520 may include a recirculating fluid chamber 560. In various embodiments, the recirculating fluid chamber 560 may provide a channel (e.g., reservoir, cannel, etc.) for the recirculated fluid to flow from the recirculated fluid inlet 515 to the recirculated fluid nozzle 545 within the recirculated fluid outlet 505'. As shown in FIG. 18, the fresh water portion 525 may include a fresh water chamber 555. In various embodiments, the fresh water chamber 555 may provide a channel (e.g., reservoir, cannel, etc.) for the fresh water to flow from the fresh water inlet 550 to the fresh water outlets 510'. As shown in FIG. 18, the recirculating fluid chamber 560 may be separate and distinct from the fresh water chamber 555 such that the recirculated fluid and the fresh water do not mix (e.g., combine, touch, etc.) within the showerhead (e.g., prior to being dispensed from the outlets). In these exemplary embodiments, the recirculated fluid and the fresh water may simultaneously dispense towards a user within the recirculating shower system 400.

Figure 19:
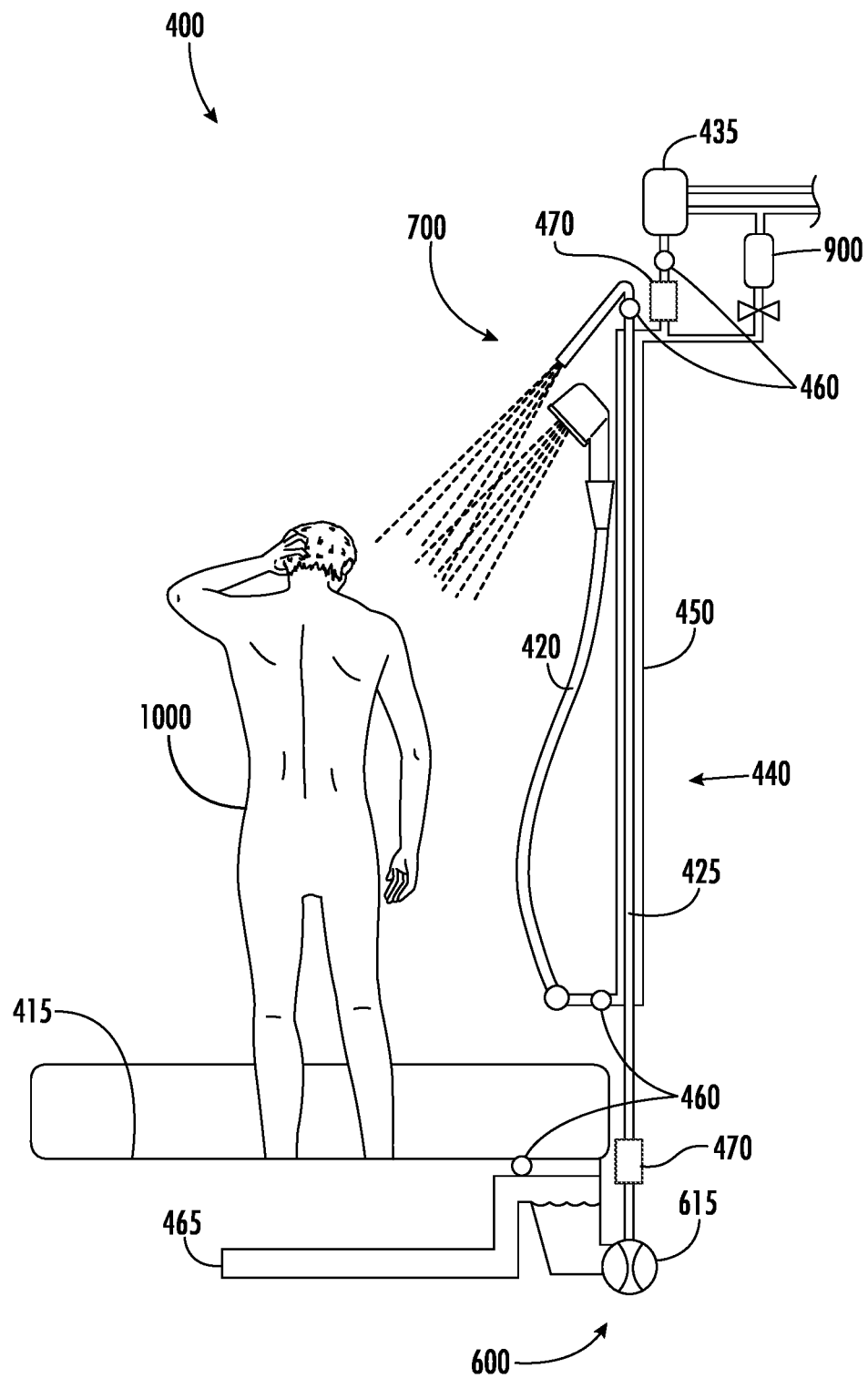
FIG. 19 is a schematic representation of a portion of a recirculating shower system, according to an exemplary embodiment.

FIG. 19 shows a schematic representation of the recirculating shower system 400 according to an exemplary embodiment. As shown in FIG. 19, the recirculating shower system 400 may include more than one showerhead (shown as showerhead assembly 700). In various embodiments, the recirculating shower system 400 may include a first showerhead within the assembly 700 configured to dispense the recirculated fluid to a user (shown as user 1000). In various embodiments, the recirculating shower system 400 may include a second showerhead within the assembly 700 configured to dispense the fresh water to the user 1000. In various embodiments, the recirculating shower system 400 may include more than two showerheads configured to dispense the recirculated fluid and the fresh water. In various embodiments, the recirculating shower system 400 may include one or more valves (e.g., diverter valve, three-way valve, etc.) operably connected to a controller (e.g., knob, switch, actuator, user interface 180, etc.) to control the flow of the recirculated fluid and/or the fresh water to the showerhead assembly 700.

As shown in FIG. 19, the recirculating shower system 400 may include one or more temperature sensors 460 positioned at various locations throughout the recirculating shower system 400. The temperature sensors 460 may be configured to detect a temperature value at various locations including, but not limited to, proximate the fresh water outlets 510, proximate the recirculated fluid outlets 505, within the heat exchanger 440, proximate the drain 430, or proximate the mixer 435. The temperature sensors 460 may be configured to send signals to a central controller system (e.g., control system 155) based on the detected temperatures. In various embodiments, the temperature sensors 460 may be configured to facilitate accommodating a specified temperature (e.g., through the mixer 435, through the heat exchanger 440, etc.). In various embodiments, the temperature sensors 460 may be configured to facilitate accommodating a specified temperature based on a user input (e.g., via one or more shower controls, knobs, user interface 180 etc.). By way of example, the control system 155 may be configured to process the signals from the temperature sensors 460 and determine, based on the signals, an operating condition of the recirculating shower system 400. The control system 155 may be configured to send one or more control signals to various components of the recirculating shower system 400 based on the operating condition (e.g., increase input of hot water, decrease input of hot water, increase flow rate of fresh water, decrease flow rate of fresh water, etc.).

As shown in FIG. 19, the recirculating shower system 400 may include one or more flow meters 470 positioned at various locations throughout the recirculating shower system 400. The flow meters 470 may be configured to detect a flow rate of the recirculated fluid and/or the fresh water at various locations including, but not limited to, at the fresh water outlets 510, at the recirculated fluid outlets 505, within the heat exchanger 440, proximate the mixer 435, or proximate the pump 615. The flow meters 470 may be configured to send signals to a central controller system (e.g., control system 155) based on the detected flow rates.

In various embodiments, the flow meters 470 and/or the temperature sensors 460 may be configured to facilitate accommodating a specified temperature (e.g., to be dispensed to the user 1000) within the recirculating shower system 400. By way of example, the control system 155 may be configured to process the signals from the flow meters 470 and/or the temperature sensors 460 and calculate, based on the signals, a required flow rate of the recirculated fluid and/or the fresh water to reach a desired temperature of fluid dispensed to the user 1000. The control system 155 may be configured to calculate, based on the signals, a required temperature of fresh water provided from the mixer 435 (e.g., amount of cold fresh water provided, amount of hot fresh water provided) to reach a desired temperature of fluid dispensed to the user 1000. The control system 155 may be configured to increase or decrease the flow rates of the fluids and/or the temperature of the fresh water within the mixer 435 based on the calculations. In these embodiments, the control system 155 may be configured to increase or decrease the flow rates and/or fresh water temperature such that the user 1000 "feels" (e.g., detects) the change of temperature within a short period of time, and substantially instantaneously (e.g., within 1 second, within 2 seconds, etc.). As a result, the system essentially removes the "thermal lag" that may be experienced in other systems that results in a delay from the time a user wishes to increase the temperature until the time that the water temperature change is felt by the user, which typically results from the fact that other systems introduce hot water into the bulk of the flow rather than directly to the user as in the present system. Thus, in the present system, if a user were to open the shower door and cooler air enters the showering space, the system may detect that and automatically increase the flow and/or temperature of hot water directly to the user so that the user experiences substantially constant temperature on their skin.

As shown in FIG. 19, the recirculating shower system 400 may include an ozone generator 900 operably coupled with the fresh water conduit 420 (e.g., via the outer pipe 450). In various embodiments, the ozone generator 900 may be configured to provide ozone (e.g., via electrolysis) to the fresh water conduit 420 to facilitate disinfecting bacteria, viruses, or other contaminates within the recirculating shower system 400. In various embodiments, the ozone generator 900 may be activated by a user input. For instance, the recirculating shower system 400 may include an actuator (e.g., button, switch, user interface 180, etc.) in which, when actuated, activates the ozone generator 900. In various embodiments, the ozone generator 900 may activate for a predetermined amount of time (e.g., 5 seconds, 10 seconds, etc.). In various embodiments, the ozone generator 900 may cease operation (e.g., shut off) based on a user input. In various other embodiments, the ozone generator 900 may be operably coupled to the control system 155 such that the ozone generator 900 may be automatically activated at predetermined times (e.g., once a day, once a week, once a month, etc.). In various embodiments, the recirculating shower system 400 may include one or more indicators to indicate activation of the ozone generator 900 including, but not limited to, a sound effect and/or visual effect, such that the user 1000 may be able to detect the indicator. In various embodiments, the ozone generator 900 may be configured to provide ozone (e.g., via electrolysis) to the fresh water conduit 420 when the fresh water within the fresh water conduit 420 is at or below a specific temperature. For instance, the temperature within the fresh water conduit 420 may be detected by one or more sensors (e.g., via temperature sensors 460, via flow meters 470, etc.). The sensors may be configured to send a signal to a controller (e.g., control system 155). The control system 155 may be configured to send one or more control signals to the ozone generator 900 to activate and/or deactivate based on the detected temperature.

As shown in FIG. 19, the recirculating shower system 400 may include a drain component 465 to facilitate draining the fresh water and/or recirculated fluid from the recirculating shower system 400 when the system 400 is not in operation (e.g., turned off). In various embodiments, the drain component 465 may include a network of pipes, channels, or the like for receiving fluid when the system 400 is shut off. For instance, the drain component 465 may be positioned at a lower point within the recirculating shower system 400 than the fresh water conduit 420 and/or the recirculated fluid conduit 425 such that gravity facilitates draining the fresh water conduit 420 and/or the recirculated fluid conduit 425 of fluid when the recirculating shower system 400 is not operating (e.g., the pump 615 is turned off, the system 400 is turned off, etc.).

Figure 20:
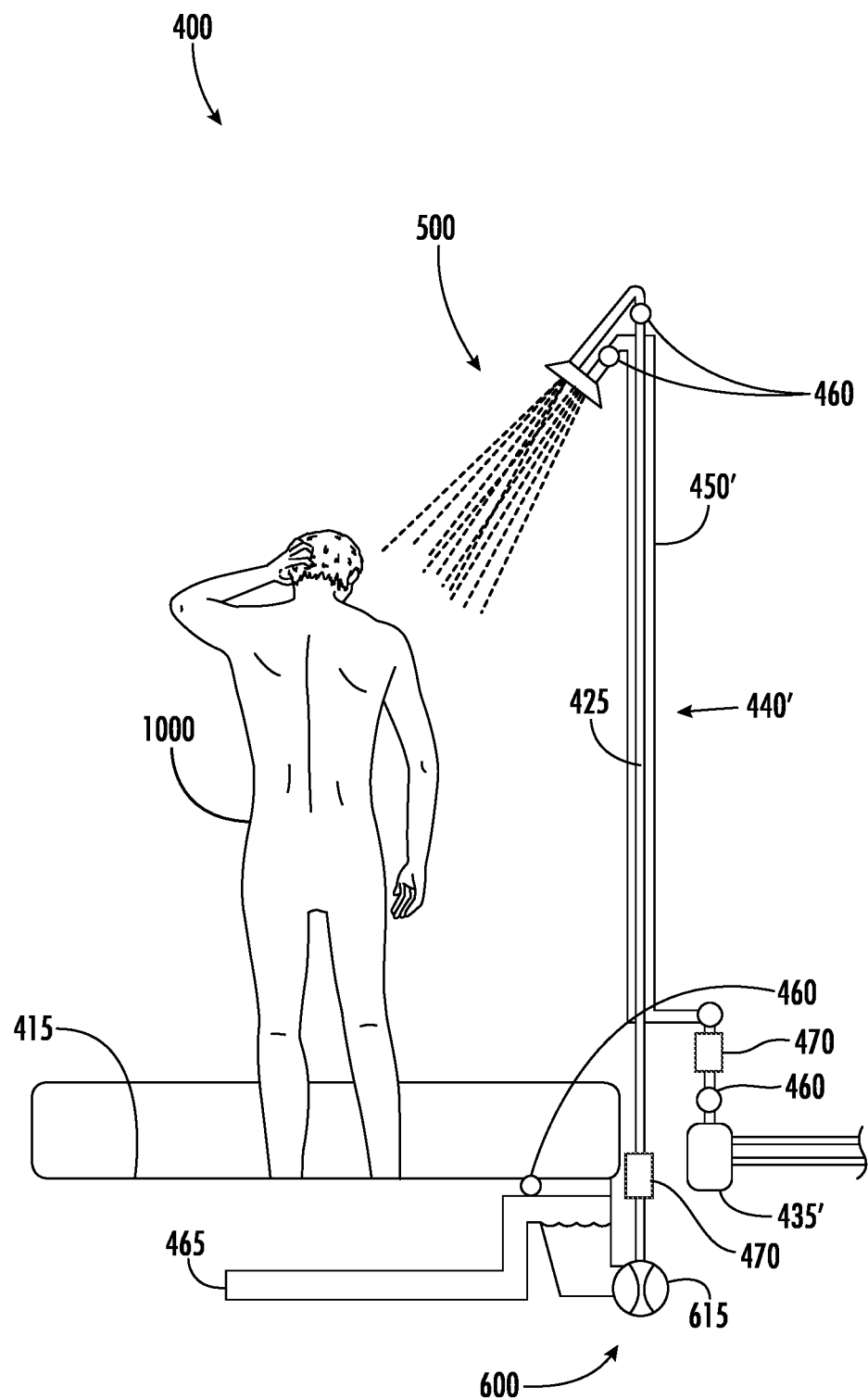
FIG. 20 is a schematic representation of a portion of a recirculating shower system, according to an exemplary embodiment.

FIG. 20 shows a schematic view of the recirculating shower system 400 according to an exemplary embodiment. As shown in FIG. 20, the recirculating shower system 400 may be configured such that the heat exchanger 440' includes the recirculated fluid flowing substantially in the same direction as the fresh water. As shown in FIG. 20, the mixer 435' can be positioned at a lower location (e.g., in line with the receptacle 415, below the user 1000, etc.) such that the fresh water received by the outer pipe 450' is configured to flow in an upward direction (e.g., towards the showerhead 500). In this embodiment, the recirculated fluid can be pumped through the recirculated fluid conduit 425 enclosed within the outer pipe 450' such that the recirculated fluid and the fresh water flow substantially in the same direction to exchange heat with one another.

Figure 21:
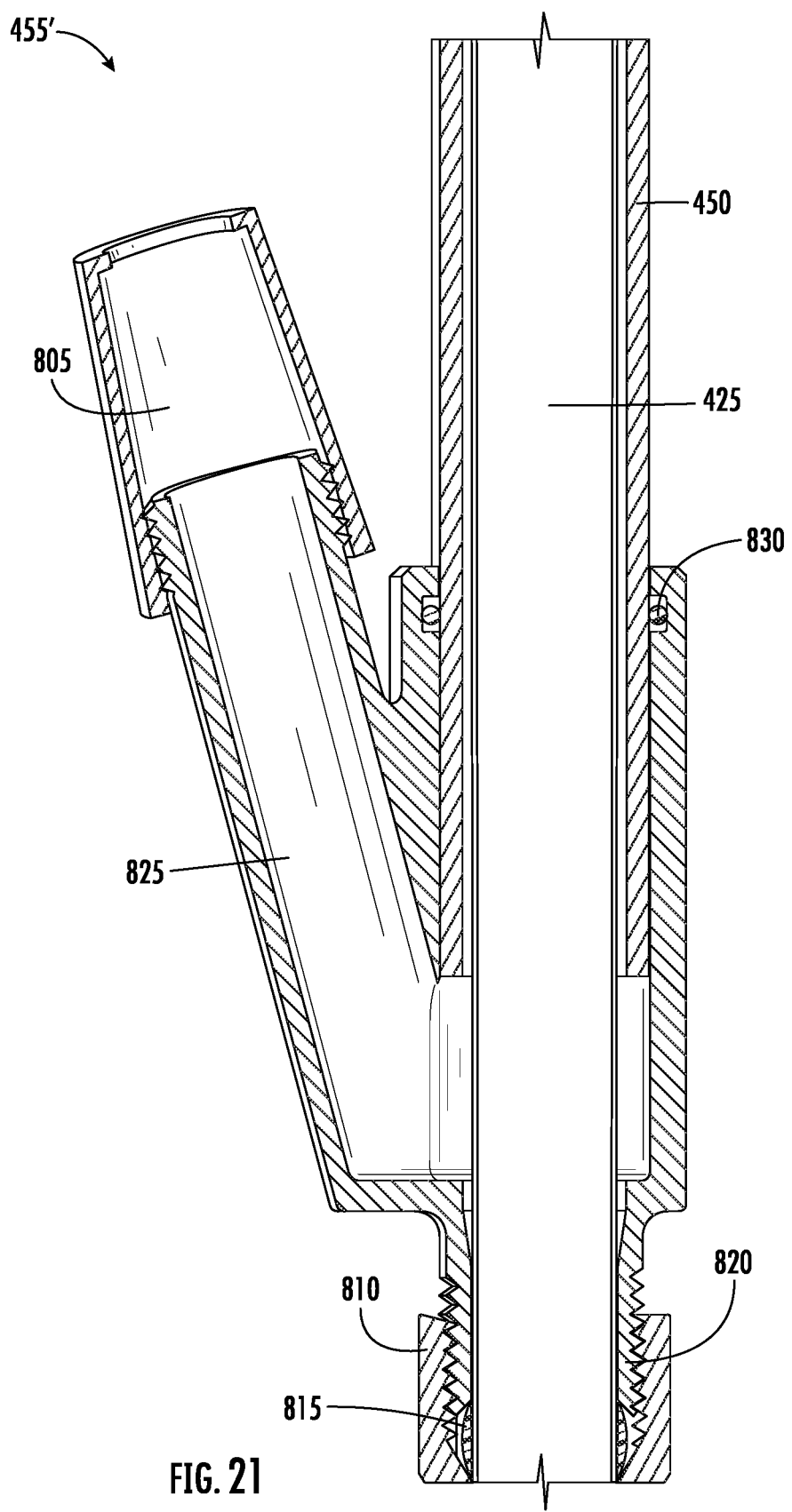
FIG. 21 is a side cross-sectional view of a portion of a recirculating shower system, according to an exemplary embodiment.

FIG. 21 shows a cross-sectional view of the coupling 455' according to an exemplary embodiment. As shown in FIG. 21, the coupling 455' can include a fitting 825 configured to couple the outer pipe 450 to the recirculated fluid conduit 425 such that the outer pipe 450 encloses a portion of the recirculated fluid conduit 425. As shown in FIG. 21, the coupling 455' may include at least one O-ring 830 positioned within the fitting 825 to facilitate sealing the outer pipe 450 around the recirculated fluid conduit 425 to create a water-tight seal. As shown in FIG. 21, the coupling 455' may include a connector 805 configured to couple the fitting 825 to the fresh water conduit 420 such that fresh water can flow from the outer pipe 450 to the fresh water conduit 420, and to the showerhead 500. As shown in FIG. 21, the coupling 455' can include a compression nut 810 and a compression gland 815 coupled (e.g., via threads 820) to the fitting 825 to create a water-tight seal and to facilitate compressing the fitting 825 around the recirculated fluid conduit 425 such that any fresh water from the outer pipe 450 flows to the fresh water conduit 420.

Figure 22:
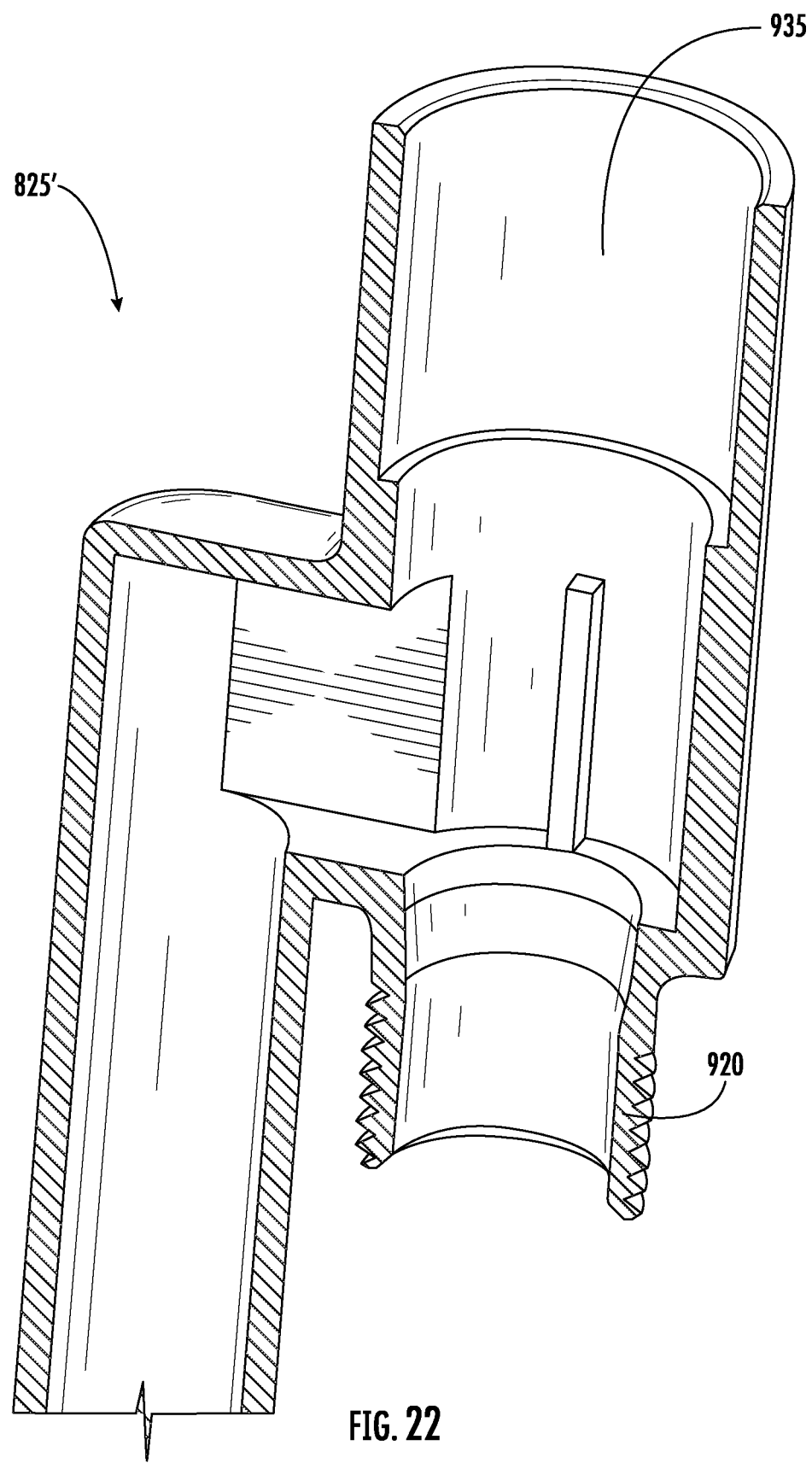
FIG. 22 is perspective cross-sectional view of a portion of a recirculating shower system, according to an exemplary embodiment.

FIG. 22 shows a cross-sectional view of the fitting 825', according to an exemplary embodiment. As shown in FIG. 22, the fitting 825' may be configured such that fresh water flowing through the outer pipe 450 may be configured to flow in various directions, using a similar compression nut 810, compression gland 815, and O-ring 830 sealing configuration described above.

Notwithstanding the embodiments described above and shown in FIGS. 1-8, various modifications and inclusions to those embodiments are contemplated and considered within the scope of the present disclosure.

As utilized herein with respect to numerical ranges, the terms "approximately," "about," "substantially," and similar terms generally mean+/−10% of the disclosed values, unless specified otherwise. As utilized herein with respect to structural features (e.g., to describe shape, size, orientation, direction, relative position, etc.), the terms "approximately," "about," "substantially," and similar terms are meant to cover minor variations in structure that may result from, for example, the manufacturing or assembly process and are intended to have a broad meaning in harmony with the common and accepted usage by those of ordinary skill in the art to which the subject matter of this disclosure pertains. Accordingly, these terms should be interpreted as indicating that insubstantial or inconsequential modifications or alterations of the subject matter described and claimed are considered to be within the scope of the disclosure as recited in the appended claims.

It should be noted that the term "exemplary" and variations thereof, as used herein to describe various embodiments, are intended to indicate that such embodiments are possible examples, representations, or illustrations of possible embodiments (and such terms are not intended to connote that such embodiments are necessarily extraordinary or superlative examples).

The term "coupled" and variations thereof, as used herein, means the joining of two members directly or indirectly to one another. Such joining may be stationary (e.g., permanent or fixed) or moveable (e.g., removable or releasable). Such joining may be achieved with the two members coupled directly to each other, with the two members coupled to each other using a separate intervening member and any additional intermediate members coupled with one another, or with the two members coupled to each other using an intervening member that is integrally formed as a single unitary body with one of the two members. If "coupled" or variations thereof are modified by an additional term (e.g., directly coupled), the generic definition of "coupled" provided above is modified by the plain language meaning of the additional term (e.g., "directly coupled" means the joining of two members without any separate intervening member), resulting in a narrower definition than the generic definition of "coupled" provided above. Such coupling may be mechanical, electrical, or fluidic.

References herein to the positions of elements (e.g., "top," "bottom," "above," "below") are merely used to describe the orientation of various elements in the FIGURES. It should be noted that the orientation of various elements may differ according to other exemplary embodiments, and that such variations are intended to be encompassed by the present disclosure.

The hardware and data processing components used to implement the various processes, operations, illustrative logics, logical blocks, modules and circuits described in connection with the embodiments disclosed herein may be implemented or performed with a general purpose single- or multi-chip processor, a digital signal processor (DSP), an application specific integrated circuit (ASIC), a field programmable gate array (FPGA), or other programmable logic device, discrete gate or transistor logic, discrete hardware components, or any combination thereof designed to perform the functions described herein. A general purpose processor may be a microprocessor, or, any conventional processor, controller, microcontroller, or state machine. A processor also may be implemented as a combination of computing devices, such as a combination of a DSP and a microprocessor, a plurality of microprocessors, one or more microprocessors in conjunction with a DSP core, or any other such configuration. In some embodiments, particular processes and methods may be performed by circuitry that is specific to a given function. The memory (e.g., memory, memory unit, storage device) may include one or more devices (e.g., RAM, ROM, Flash memory, hard disk storage) for storing data and/or computer code for completing or facilitating the various processes, layers and modules described in the present disclosure. The memory may be or include volatile memory or non-volatile memory, and may include database components, object code components, script components, or any other type of information structure for supporting the various activities and information structures described in the present disclosure. According to an exemplary embodiment, the memory is communicably connected to the processor via a processing circuit and includes computer code for executing (e.g., by the processing circuit or the processor) the one or more processes described herein.

The present disclosure contemplates methods, systems and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

Although the figures and description may illustrate a specific order of method steps, the order of such steps may differ from what is depicted and described, unless specified differently above. Also, two or more steps may be performed concurrently or with partial concurrence, unless specified differently above.

It is important to note that any element disclosed in one embodiment may be incorporated or utilized with any other embodiment disclosed herein. For example, the user interface 180 of the exemplary embodiment described with respect to FIG. 2 may be incorporated in the recirculating shower system 400 of the exemplary embodiment described with respect to FIG. 14. Although only one example of an element from one embodiment that can be incorporated or utilized in another embodiment has been described above, it should be appreciated that other elements of the various embodiments may be incorporated or utilized with any of the other embodiments disclosed herein.

What is claimed is:

1. A showerhead for a recirculating shower system, the showerhead comprising:
    a first portion comprising a nozzle defining a first fluid outlet, the first fluid outlet being configured to dispense a recirculated fluid from a recirculated fluid supply; and
    a second portion configured to removably couple to the first portion, the second portion comprising a second fluid outlet and an opening, the second fluid outlet being configured to dispense fresh water from a fresh water supply;
    wherein the first portion is configured to dispense the recirculated fluid from the first fluid outlet and through the opening of the second portion when the second portion is coupled to the first portion.

2. The showerhead of claim 1, wherein the first portion is configured to be fixedly mounted within a shower enclosure and the second portion is a handshower.

3. The showerhead of claim 1, wherein the nozzle is positioned within the opening of the second portion when the second portion is coupled to the first portion.

4. The showerhead of claim 1, wherein the nozzle at least partially protrudes from the opening of the second portion when the second portion is coupled to the first portion.

5. The showerhead of claim 1, wherein the first fluid outlet is larger than the second fluid outlet such that the first fluid outlet is configured to dispense the recirculated fluid and the second fluid outlet is configured to dispense the fresh water.

6. The showerhead of claim 1, wherein:
    the nozzle is a first nozzle;
    the first portion further comprises a second nozzle defining a third fluid outlet;
    the opening is a first opening;
    the second portion further comprises a second opening; and
    the first portion is configured to dispense fluid from the third fluid outlet through the second opening of the second portion when the second portion is coupled to the first portion.

7. The showerhead of claim 1, wherein the second portion comprises a first retainer and a second retainer, the first retainer comprises a clip and the second retainer comprises a latch, and the first retainer and the second retainer are configured to engage the first portion to facilitate coupling the second portion to the first portion.

8. The showerhead of claim 1, wherein the first portion defines a first fluid chamber and the second portion defines a second fluid chamber separate from the first fluid chamber such that the recirculated water flowing through the first fluid chamber does not mix with the fresh water flowing through the second fluid chamber prior to being dispensed from the showerhead.

9. A recirculating shower system, comprising:
   a recirculated water conduit;
   a fresh water conduit; and
   a showerhead comprising:
   a first portion comprising a first fluid inlet and a plurality of nozzles defining a first fluid outlet, the first fluid inlet being fluidly coupled to the recirculated water conduit; and
   a second portion configured to removably couple to the first portion, the second portion comprising second fluid inlet, a second fluid outlet, and a plurality of openings, the second fluid inlet being fluidly coupled to the fresh water conduit;
   wherein the first portion is configured to dispense fluid from the first fluid outlet and through the plurality of openings of the second portion when the second portion is coupled to the first portion.

10. The recirculating shower system of claim 9, wherein a respective one of the plurality of openings is configured to receive a respective one of the plurality of nozzles.

11. The recirculating shower system of claim 10, wherein the plurality of nozzles are positioned within the plurality of openings when the second portion is coupled to the first portion.

12. The recirculating shower system of claim 10, wherein the plurality of nozzles at least partially protrudes from the plurality of openings of the second portion when the second portion is coupled to the first portion.

13. The recirculating shower system of claim 10, wherein the plurality of openings are larger than the plurality of nozzles.

14. A recirculating shower system, comprising:
   a recirculated fluid conduit;
   a fresh water conduit;
   a first mixing device upstream the fresh water conduit, the first mixing device configured to mix a hot fluid from a hot fluid supply and a cool fluid from a cool fluid supply; and
   a showerhead comprising:
   a first portion comprising fluid inlet and a first plurality of nozzles defining a first fluid outlet, the first portion being coupled to the recirculated fluid conduit; and
   a second portion configured to couple to the first portion, the second portion comprising second fluid inlet, a second fluid outlet, and a plurality of openings, the second portion being coupled to the fresh water conduit;
   wherein the first portion is configured to dispense fluid from the first fluid outlet and through the plurality of openings of the second portion when the second portion is coupled to the first portion.

15. The recirculating shower system of claim 14, further comprising:
   a receptacle operably coupled to the showerhead and configured to collect fluid dispensed from the first fluid outlet and the second fluid outlet; and
   wherein the fluid collected by the receptacle is heated upstream of the showerhead.

16. The recirculating shower system of claim 14, wherein the showerhead comprises a first fluid chamber in fluid communication with the recirculated fluid conduit and a second fluid chamber separate from the first fluid chamber and in fluid communication with the fresh water conduit such that recirculated water of the recirculated fluid conduit does not mix with fresh water of the fresh water conduit prior to being discharged from the showerhead.

\* \* \* \* \*